(12) United States Patent
Hoffer, Jr.

(10) Patent No.: US 11,656,344 B2
(45) Date of Patent: May 23, 2023

(54) LIGHT-BASED POSITION MEASUREMENT DEVICE WITH ATMOSPHERIC CORRECTION

(71) Applicant: John M. Hoffer, Jr., Columbia, MD (US)

(72) Inventor: John M. Hoffer, Jr., Columbia, MD (US)

(73) Assignee: TVS HOLDINGS, LLC, Columbia, MD (US)

( * ) Notice: Subject to any disclaimer, the term of this patent is extended or adjusted under 35 U.S.C. 154(b) by 0 days.

(21) Appl. No.: 17/619,890

(22) PCT Filed: Apr. 28, 2021

(86) PCT No.: PCT/US2021/029567
§ 371 (c)(1),
(2) Date: Dec. 16, 2021

(87) PCT Pub. No.: WO2021/222360
PCT Pub. Date: Nov. 4, 2021

(65) Prior Publication Data
US 2022/0326363 A1 Oct. 13, 2022

Related U.S. Application Data

(60) Provisional application No. 63/016,964, filed on Apr. 28, 2020.

(51) Int. Cl.
*G01S 7/48* (2006.01)
*G01S 7/497* (2006.01)
(Continued)

(52) U.S. Cl.
CPC ............ *G01S 7/497* (2013.01); *G01S 7/4816* (2013.01); *G01S 7/4817* (2013.01); *G01S 17/08* (2013.01)

(58) Field of Classification Search
USPC ........................................................ 356/4.01
See application file for complete search history.

(56) References Cited

U.S. PATENT DOCUMENTS 4,910,395 A * 3/1990 Frankel .................... G01S 3/786
356/141.5
6,497,483 B2 * 12/2002 Frey ........................ A61B 3/158
351/212

(Continued)

*Primary Examiner* — James R Hulka
(74) *Attorney, Agent, or Firm* — Invention To Patent Services; Alex Hobson

(57) ABSTRACT

A position measurement system is configured to measure its position in one or more degrees of freedom with respect to a beam of light while addressing errors caused by atmospheric distortions. Atmospheric distortions can be measured using a wavefront sensor. Data from such a sensor can be used in combination with a beam position sensing device, such that wavefront data can determine if beam position device data should be discarded or can be used to correct the beam position device mathematically. Alternately, the wavefront sensor data can be used to control an adaptive optic that has the ability to receive a distorted beam and then transmit an undistorted beam to the beam position sensing device, eliminating the need to mathematically correct the data from the beam position sensing device. Finally, the wavefront sensor itself can be used to both measure wavefront distortions as well as determine beam position.

23 Claims, 25 Drawing Sheets

(51) Int. Cl.
  *G01S 7/481*       (2006.01)
  *G01S 17/08*       (2006.01)

(56) References Cited

U.S. PATENT DOCUMENTS

| | | | | |
|---|---|---|---|---|
| 6,631,991 B2 * | 10/2003 | Wirth | ................. | A61L 31/048 |
| | | | | 351/221 |
| 6,714,307 B2 * | 3/2004 | De Groot | ............ | G01B 11/306 |
| | | | | 356/512 |
| 7,792,249 B2 * | 9/2010 | Gertner | ............... | A61N 5/1049 |
| | | | | 606/4 |
| 9,599,558 B2 * | 3/2017 | Westphal | ............... | G01N 21/25 |
| 9,791,569 B2 * | 10/2017 | Hughes | ................. | G01S 17/42 |
| 9,976,947 B1 | 5/2018 | Hoffer, Jr. | | |
| 2002/0159030 A1 | 10/2002 | Frey et al. | | |
| 2003/0011784 A1 | 1/2003 | De Groot et al. | | |
| 2003/0053028 A1 | 3/2003 | Wirth | | |
| 2009/0161827 A1 | 6/2009 | Gertiner et al. | | |
| 2014/0043474 A1 * | 2/2014 | Westphal | ............... | G01N 21/25 |
| | | | | 348/136 |
| 2015/0085297 A1 * | 3/2015 | Hughes | ................. | G01S 7/497 |
| | | | | 356/482 |

* cited by examiner

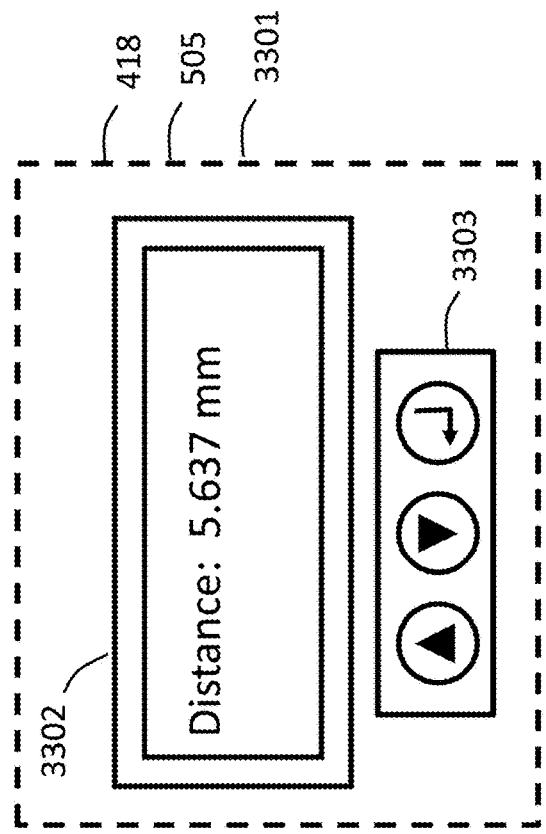
Figure 37
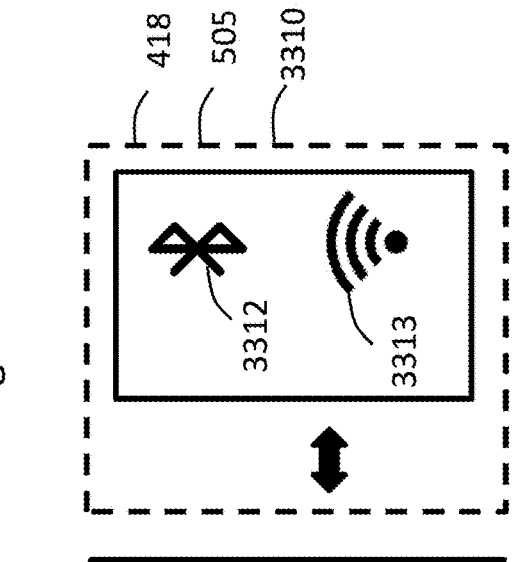
Figure 39
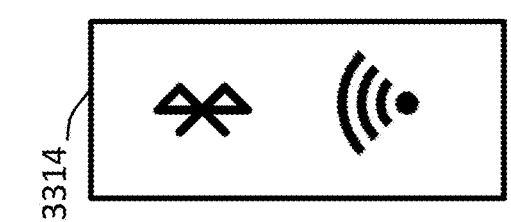
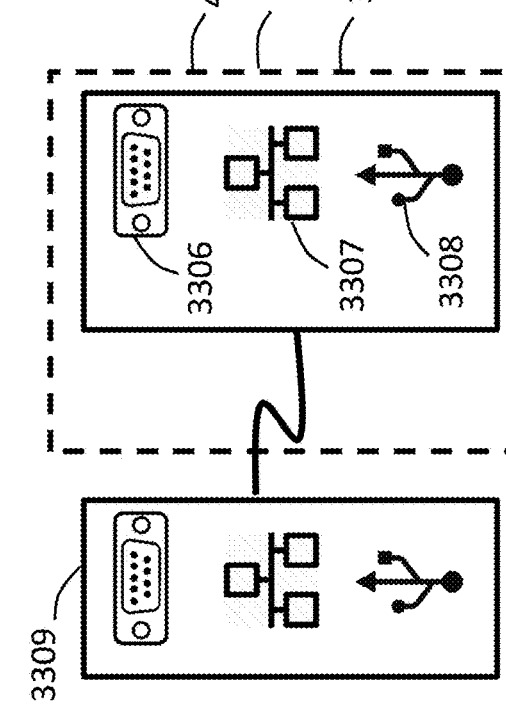
Figure 38

LIGHT-BASED POSITION MEASUREMENT DEVICE WITH ATMOSPHERIC CORRECTION

CROSS REFERENCE TO RELATED APPLICATIONS

This application claims the benefit of priority to U.S. provisional patent application No. 63/016,964, filed on Apr. 28, 2020; the entirety of which is hereby incorporated by reference herein.

BACKGROUND OF THE INVENTION

Field of the Invention

The invention relates a position measurement device that uses a beam of light with the ability to correct for atmospheric distortions.

Background

A beam of light, such as a laser beam is often used as means of performing dimensional measurements of objects and for positioning objects. Often, light is transmitted by a device to a reflective target that directs the light back to be processed by one or more sensors to determine position and orientation in up to six degrees of freedom, which includes 3-D position with respect to a defined coordinate system and rotation about the three axes of the coordinate system. The reflective targets are coupled to the object being measured in some way that the target information can be translated to a measurement of the object or its position.

In other systems, there is a device that transmits a laser beam to the target, and rather than reflecting the beam back to the source, is capable of performing a position measurement with respect to the laser beam.

Some systems may have both where the target reflects a portion of the light back to the source for position measurement while the target performs additional processing often combining the results to create a six degree of freedom measurement.

The accuracy of these devices is impacted by atmospheric distortions that are created when the medium though which the light is traveling, such as air is not homogenous with respect to parameters such as temperature, pressure, or humidity. An everyday example of this is the shimmer that is observed when viewing an asphalt road that is has been sitting in the sun, which heats the air near the surface and then rises up and swirls through the cooler air. Different parts of the beam traveling though these variances will travel at slightly different speeds, which will create changes in direction as well as causing the beam to arrive at a sensor at slightly different times creating wavefront distortion. A distorted beam can introduce measurement errors in sensors that measure beam position, so measurements devices that use these sensors generally require air to be homogenous and will further use filtering methods such as averaging to reduce the impact of any distortions. Because these disturbances occur at low frequency, samples have to be taken over a long period of time to ensure that their corresponding errors can be minimized.

An example of one of these systems for performing 3-D measurements is defined in U.S. Pat. No. 4,790,651 Tracking Laser Interferometer, Brown et al. This device follows a reflective target using an interferometer to provide the distance to the target and angular encoders in combination with a position-sensing device to provide the transverse measurements. In this system, rotation of the target about the axes of the coordinate system is not available. Often, the reflector is mounted in a sphere that has a known radius from the center of the target to the surface of the sphere such that the target measurements can be projected to the location where the surface of the sphere touches the object being measured.

An alternate method of measuring more degrees of freedom is disclosed in U.S. Pat. No. 4,714,339 Three and Five Axis Laser Tracking Systems, Lau et al. Described is a target with a beam splitter and a position-sensing device, which can provide two rotation angles and two linear displacements. The shortcoming of this invention is the field of view for determining the pitch and yaw angles is limited to the field of view of the position sensing device. In addition, there is no measurement of rotation about the axis of the beam.

U.S. Pat. No. 9,976,947 Position Measurement Device. Hoffer discloses a method for performing a six degree of freedom measurement using a combination of moving optics and the polarization property of light.

Each of these demonstrate methods to measure one or more degrees of freedom, but do not address the challenge of atmospheric disturbances that occur during measurement.

A wavefront sensor has the ability to measure the distortions and correct them either mathematically or to adjust an optic to correct the distortion and minimize the error in real-time thus allowing for faster measurements while maintaining accuracy in environments that are more prone to atmospheric distortions.

SUMMARY OF THE INVENTION

The invention is directed to a device with the ability to measure its position in one or more degrees of freedom with respect to a beam of light while addressing errors caused by atmospheric distortions. Atmospheric distortions can be measured using a wavefront sensor. Data from such a sensor can be used in combination with a beam position sensing device, such that wavefront data can determine if beam position device data should be discarded or can be used to correct the beam position device mathematically. Alternately, the wavefront sensor data can be used to control an adaptive optic that has the ability to receive a distorted beam and then transmit an undistorted beam to the beam position sensing device, eliminating the need to mathematically correct the data from the beam position sensing device. Finally, the wavefront sensor itself can be used to both measure wavefront distortions as well as determine beam position.

These corrected beam position measurements can be done in systems where a beam reflected from a target is measured by a light source as well as targets that process the beam position directly. These corrected measurements can be combined with measurements of the length of the beam and beam steering assemblies to produce large volume measurements in up to six degrees of freedom.

An exemplary embodiment of the measurement system has a measurement light transmitter and measurement light receiver. The measurement light transmitter comprises a mechanical assembly that couples a laser with collimating optics to create a collimated, Gaussian light beam with a diameter of approximately 10 mm. The collimated laser beam is directed from the aperture in the measurement light transmitter toward a measurement light receiver comprising a mechanical assembly with an aperture leading to a wavefront sensor. The working area of the sensor is large enough to accommodate the center of the laser beam impinging 2 mm off-center without clipping off the edges of the beam. The wavefront sensor has integrated electronics that convert sensor outputs to a stream of digital values through a serial interface that represent the position of the beam, on the sensor, the intensity profile of the beam, and the wavefront, which is target input wavefront data. The target input wavefront data is processed by a transverse measurement and control algorithm executed on a processor to produce a positional measurement of the beam position on the sensor and output the value through a communication interface.

An exemplary embodiment of the wavefront sensor is a Shack-Hartman sensor where a lenslet array is mounted one focal length from a photodiode array. An exemplary lenslet array would be a two dimensional grid of 501×501 lenses covering an exemplary photodiode array of 1503×1503 pixels with a size of 15 m×15 mm. Each lens in the lenslet array would be represented by 9 pixels. The exemplary target input wavefront data would then consist of 2,259,000 values ranging from 0 to 255, which would be subdivided into 3×3 arrays of pixels that represent data related to each lenslet.

An exemplary target transverse measurement and control algorithm, which is a transverse measurement algorithm, the target input wavefront data is first processed to find the boundary of the beam on the sensor, which allows calculation of a beam position. We then evaluate the data within the boundary to determine the amount of distortion of the beam. If the beam is not distorted, the algorithm emits the calculated beam position. Otherwise, it discards the data and waits for the new wavefront data from the sensor. This is accomplished by first creating a coarse image, which all of the pixels for a single lens in the lenslet array are added together to create lenslet pixel value. The lenslet pixels are organized in a 2D array corresponding to their physical position. The coarse image is then evaluated to find the edges of the beam using a first order derivative, which establishes the working area for sensor. In addition, the $M^2$ value for the beam is calculated within the working area from the target input wavefront data and compared to an expected $M^2$ value. If the calculated value deviates from the expected value by less than a predetermined percentage, the centroid of the beam is calculated, and that position of that centroid is reported with respect to the location of the pixel at the center of the sensor. If the calculated $M^2$ value exceeds the predetermined percentage, all of the data is discarded and new data is retrieved from the sensor. This filtering process ensures that only undistorted data is used for position calculations.

An exemplary embodiment, the measurement light transmitter measures the position of a reflective target. The measurement light transmitter comprises a mechanical structure that couples the laser, collimating optics, two 50/50 non-polarizing beam splitters, a beam position sensing device and a wavefront sensor. The mechanical assembly also provides a mechanical mount allowing it to be held in a fixed position. The laser is coupled with collimating optics to create a collimated, Gaussian light beam with a diameter of approximately 10 mm. The laser beam impinges on a first 50/50 non-polarizing beam splitter such that a portion of the beam is reflected and absorbed and the reaming portion is transmitted toward a retro reflector with 80% reflectance whose apex is within 1 mm of the center of the laser beam and located at an arbitrary distance along the axis. The retro reflector reflects a light beam back toward the device that is parallel to the outgoing beam. The reflected beam impinges on the first beam splitter such that a portion is reflected toward the second beam splitter. The second beam splitter is mounted so that its center aligns with the center of the first beam splitter. The second splitter transmits a portion of the beam to the beam position sensing device and reflects a portion of the beam toward a wavefront sensor. Both the beam position sensing device and wavefront sensor centers are aligned with the center of the second beam splitter. The beam position sensing device produces electrical signals that correspond to both the beam power and beam position impinging on the sensor. The wavefront sensor has integrated electronics that convert sensor outputs to a stream of digital values through a serial interface. The measurement device further comprises electronics to condition the signals from the beam position sensing device and convert them to numeric values. The electronics also comprise a processor and a communication system. The processor reads the values from both the beam position sensing device and the wavefront sensor. The wavefront sensor data is used to calculate the amount of distortion. The beam position is then calculated using data from the beam position sensor and adjusting it for the distortion as measured by the wavefront sensor.

An exemplary target transverse measurement and control algorithm, which is a transverse measurement algorithm, the data from a beam position sensing device such as a lateral photo diode is processed to calculate an initial beam position. Data from the wavefront sensor is then processed by calculating the center of gravity of the light for each lenslet and comparing that to the ideal center of gravity. An average error in the center of gravity in two dimensions can then be calculated, and that error is then applied to the PSD beam position data output to correct the position reading to produce the transverse measurement of the light beam.

In an exemplary embodiment, the beam position sensing device is a lateral photodiode that generates four current signals that correspond to both the intensity of the beam and the beam position impinging on the cell. These signals are labeled A, B, C, and D and the beam position sensing device is oriented such that the A and C signals correspond to the horizontal position of the beam and the B and D signals correspond to the vertical position of the beam. Transimpedance amplifiers convert the individual currents to voltages and are scaled such that signals from the device will not exceed the voltage limits of an analog to digital converter when the beam is 2 mm off center. The four voltages are digitized with the A/D and those values used to calculate the position are a target beam position data output;

A and C represent the horizontal position of the beam on the sensor, so the horizontal position calculated by the beam position calculation algorithm as follows:

$$Hz = \left(\frac{A-C}{A+C}\right)\text{scale} \qquad (1)$$

B and D represent the vertical position of the beam on the sensor, so the vertical position calculated by the beam position calculation algorithm as follows:

$$Vt = \left(\frac{B-D}{B+D}\right)\text{scale} \qquad (2)$$

An exemplary embodiment further includes adaptive optics, driving electronics for the adaptive optics, and an algorithm to calculate the configuration of the adaptive optics that inserted into the beam path before the beam position sensing device such that the beam exiting the beam splitter will first impinge the adaptive optics and then be relayed to the beam position sensing device. The processor reads data from the wavefront sensor and calculates the wavefront distortion, which in turn is used to configure the adaptive optics, which will reshape the light beam which will create a corrected light beam that impinges on the beam position sensing device. The beam position can then be calculated from the beam position sensing device without performing any additional mathematical adjustments for wavefront distortion.

In an exemplary embodiment, the measurement light transmitter comprises a distance measurement device. The distance measurement is combined with the beam positions measurements to produce a three-dimensional location of a target.

In an exemplary embodiment, the measurement light transmitter further comprises a two axis beam steering assembly. The beam steering assembly provides a larger field of view for the device.

An exemplary phase comparison algorithm uses 10 sample from a first radial measurement input, and calculates the phase first calculating the real and imaginary portions as follows (note sine and cosine angles are in radians):

$$X_1 = \frac{1}{10}\sum_{n=0}^{9} I_n \cos\left(\frac{2\pi n}{10}\right) \quad (3)$$

$$Y_1 = \frac{1}{10}\sum_{n=0}^{9} I_n \sin\left(\frac{2\pi n}{10}\right) \quad (4)$$

The phase angle is then calculated as follows:

$$\theta = a\tan(X_1/Y_1) \quad (5)$$

A distance can then be calculated as follows:

$$\text{Distance} = (\theta/2\pi)*\text{scale} \quad (6)$$

Definitions

Motor, as used herein, is a device capable of changing the physical position of an object.

An encoder, as used herein, is a device capable of measuring the physical displacement of an object.

The term optic, as used herein, is an item that is able to modify one or more properties of light such as intensity, direction, polarization, or wavelength.

Steering Optic, as used herein is any item that can change the direction of a beam of light either through reflection or refraction.

Aperture as used herein, is defined as a boundary. In other words, a beam splitter has a physical size and only light can enter the optical system there.

Intensity sensor, as used herein, is a photo sensor, photo diode, lateral photo diode, quadcell, image sensor (photodiode array, CCD, CMOS). We classify all of these together since each one provides at its basic level an intensity reading. Everything other than the photo sensor (photo diode), can provide additional information such as position.

Beam position sensing device, as used herein is a lateral photo diode, quadcell or image sensor (photodiode array, CCD, CMOS), capable of providing information that can determine the position of a beam of light with respect to some defined location on the sensor.

Beam steering assembly, as used herein defines a device capable of redirecting an input light beam in a different direction as providing data as to the orientation of its optics that can be related to the direction of the outgoing beam.

Distance measurement device, as used herein as capable of measuring the length of a laser beam through techniques such as interferometry or intensity modulation.

Beam splitter as used herein is any device that that is able to receive a single beam and split it into two or more beams. Beam splitters have types that include cube, plate, or fiber. Beams may be split by intensity (non-polarizing beam splitter), by polarization (polarizing beam splitter), or wavelength (dichroic beam splitter). A beam splitter may also combine two or more beam inputs back into a single beam output.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 37 shows an exemplary communication system, where communication is with a person where the display is an output to the user and the buttons are input from the user.

FIG. 38 shows an exemplary wired communication system such as serial, Ethernet, and USB.

FIG. 39 shows an exemplary wireless communication system such as Bluetooth or WiFi.

Figure 1:
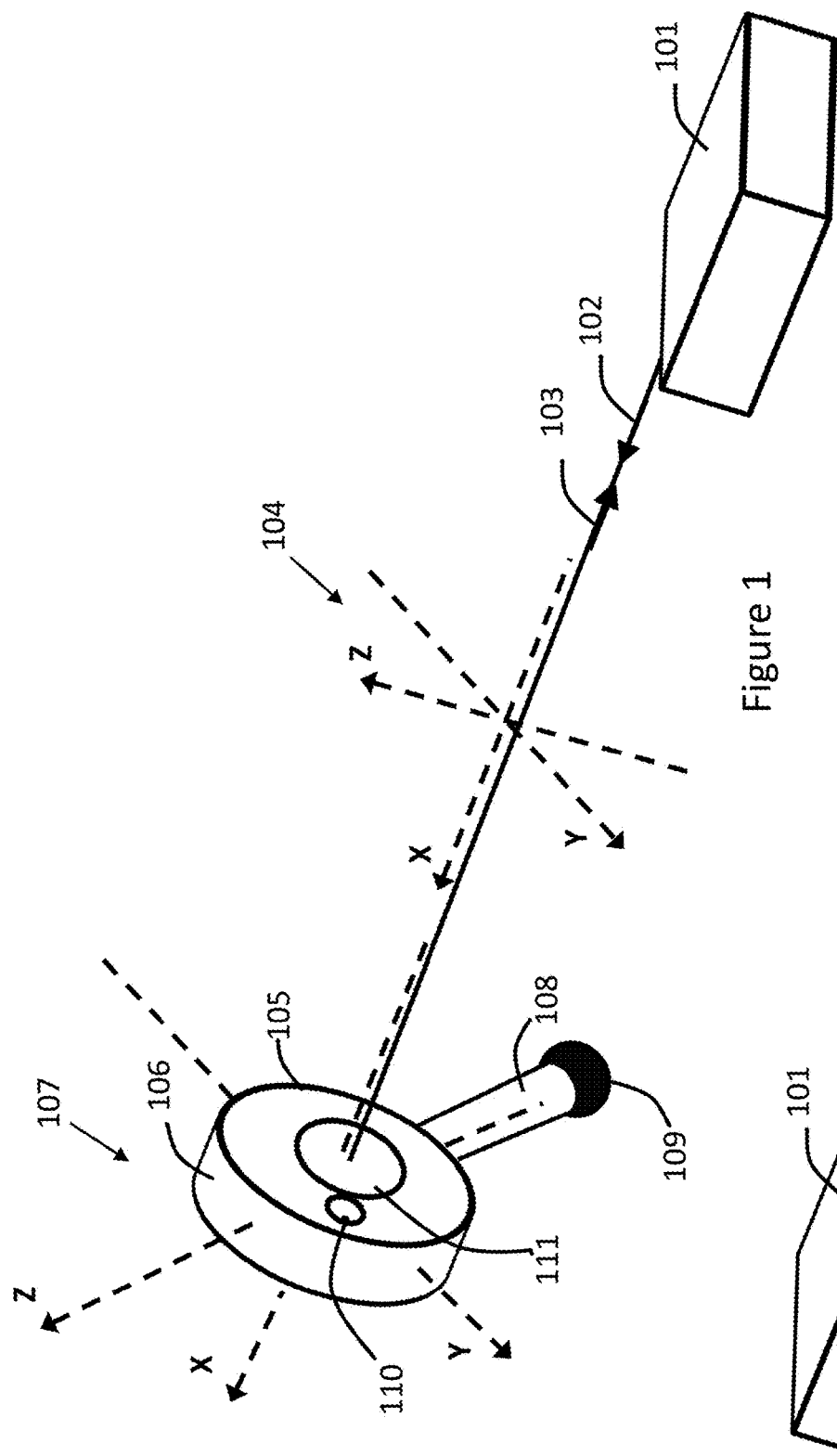
FIG. 1 show an exemplary measurement system showing a source with a probe as the target.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

FIG. 1 is an exemplary measurement system comprising of a measurement source 101, which is a measurement light transmitter, with an emitted a measurement beam 102 transmitted toward a light receiving target 106, which is a measurement light receiver, and received through the target light aperture 111 impinging on a sensor and the data produced by said sensor may be processed to produce one or more position measurements with respect to the light receiving target coordinate system 107. Said light receiving target may calculate a position of a target extension tip 109 at the end of a target extension 108 allowing for measurements out of the line of sight of the said measurement beam. Said light receiving target may comprise a reflective target 105 reflecting a portion of said emitted measurement beam as a reflected measurement beam 103 back toward said measurement source and received by said measurement source impinging upon one or more sensors. Data produced by these sensors will be processed to produce position measurements within a measure coordinate system 104.

Figure 2:
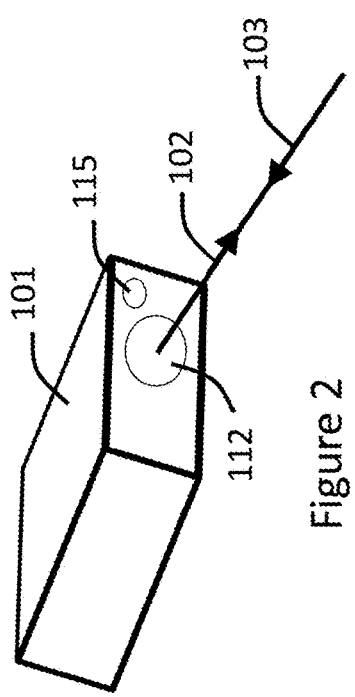
FIG. 2 shows an exemplary measurement source light aperture.

FIG. 2 is an exemplary measurement source 101 with a measurement source light aperture 112 capable of both transmitting an emitted measurement beam 102 and receiving a reflected measurement beam 103. Also shown is a source orientation indicator assembly 115 that when used in combination with an image sensor can be used to address 180-degree ambiguity of the roll measurement or can be used to determine additional degrees of freedom. The source indicators can be a light source or a reflective target.

Figure 3:
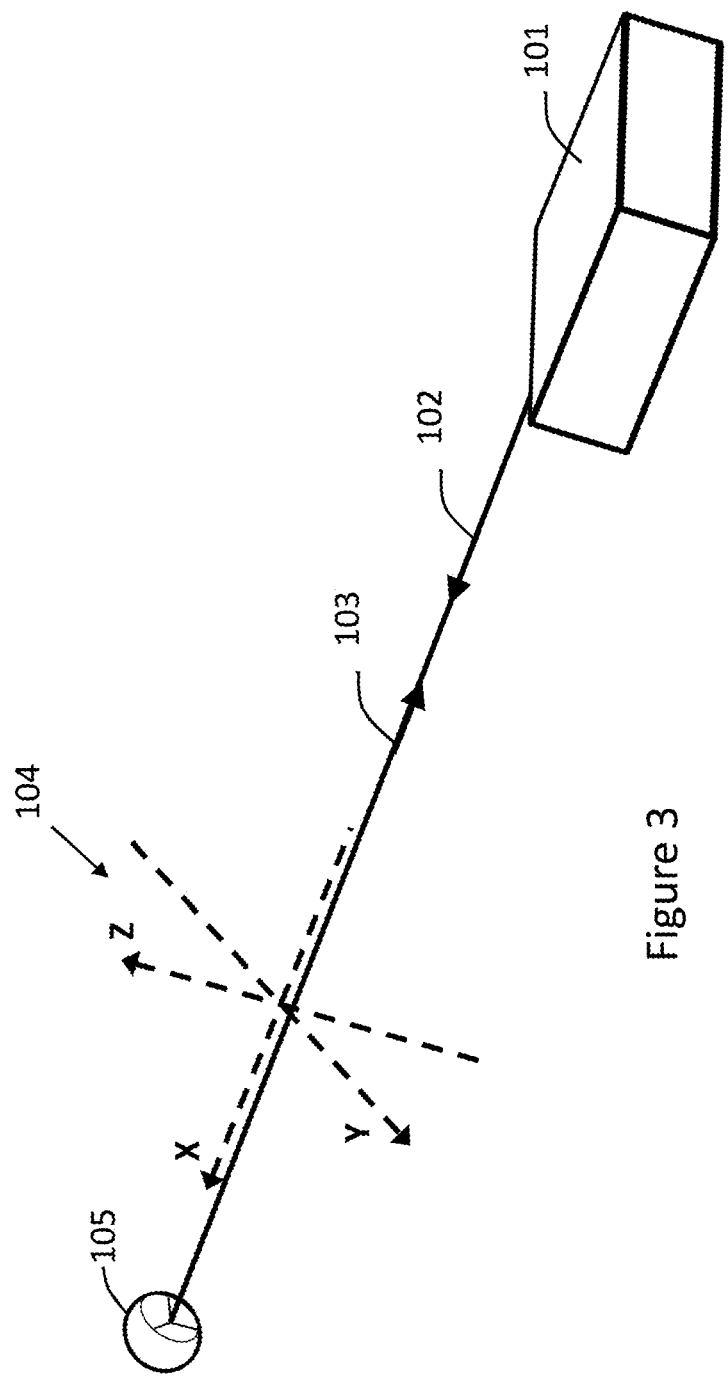
FIG. 3 shows an exemplary measurement system showing a measurement system with a simple reflective target.

FIG. 3 is an exemplary measurement system where only a reflective target 105 is used and position measurements are produced with respect to coordinate system 104.

Figure 4:
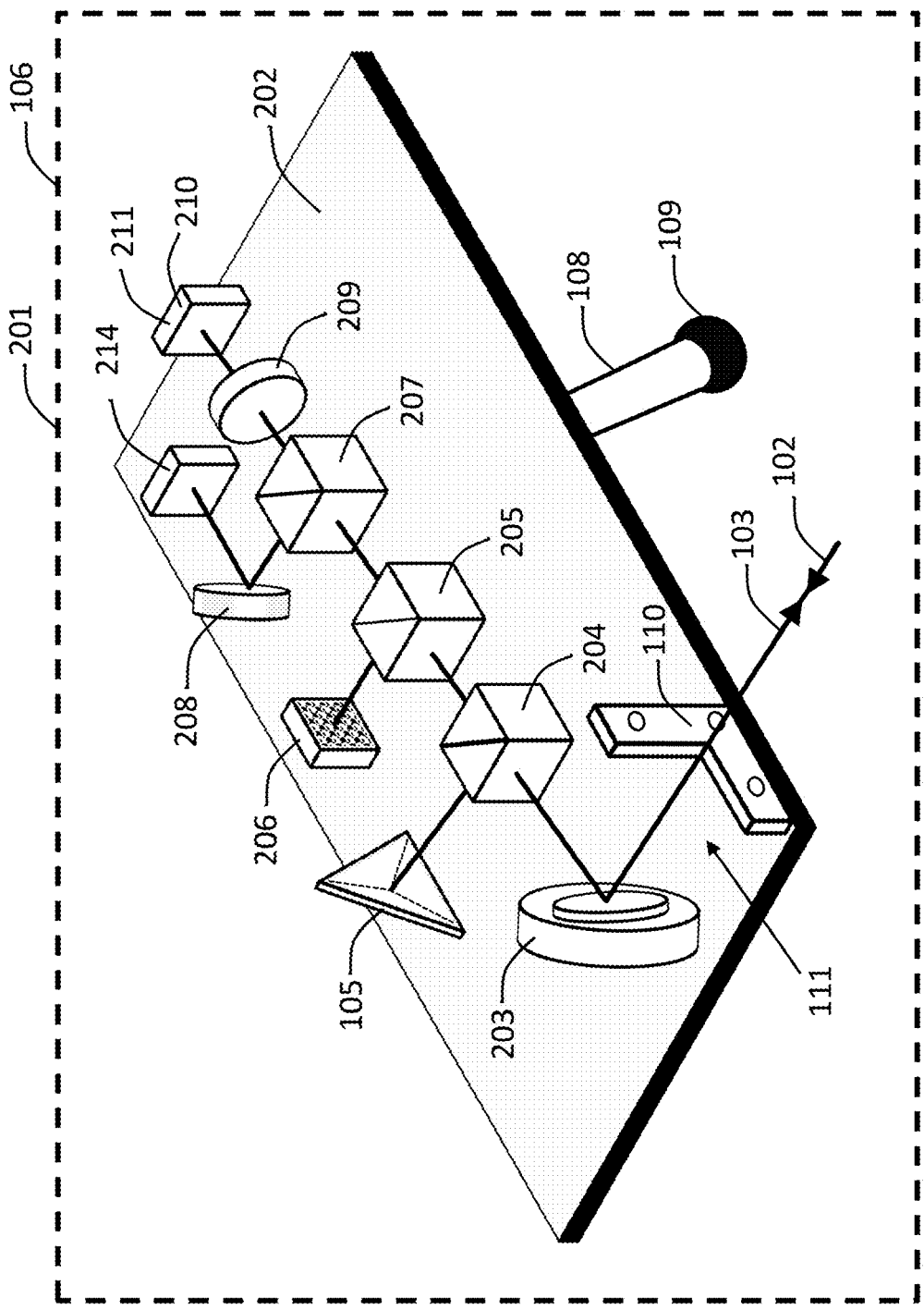
FIG. 4 shows an exemplary target platform capable of providing multiple degrees of freedom measurement and projected to a measurement probe tip.

FIG. 4 is an exemplary target electro-optical assembly 201 that is found in a light receiving target 106. Said target electro-optical assembly comprises a target electro-optical mounting structure 202 to which all optics and sensors are mounted in a fixed relationship to each other. Measurement beam 102 enters through the target light aperture 111 and impinges on a target beam steering assembly 203 capable of redirecting said measurement beam toward target reflector beam splitter 204 thus allowing for a wide range of angles said measurement beam can enter said target light aperture. Said target reflector beam splitter sends a portion of said measurement beam toward reflective target 105, which will reflect light back through said target reflector beam splitter, which will reflect a portion of light back toward said target beam steering assembly which in turn transmits a reflected measurement beam 103 back a path parallel to said measurement beam. A portion of light is transmitted through said target reflector beam splitter towards a target wavefront beam splitter 205. A portion of light is reflected toward and impinges on target wavefront sensor 206. A portion of light is transmitted toward target reference beam splitter 207, which reflects a portion of light toward a target wavefront corrector 208 which in turn reflects the beam to a target beam position sensing device 214. Rigidly attached to said target-electro optical assembly is a target extension 108 such that target extension tip 109 is in a known and fixed positional relationship to said target electro-optical assembly. A portion of the light transmitted through said target reference beam splitter passes through a variable polarizing filter platform 209 to a first beam intensity sensor 210 that is a first beam position device 211. Said first beam position device is at a different distance than said target beam position sensing device allowing for the combination of the two sensor readings to determine angular and transverse positions with respect to said measurement beam. Said variable polarizing filter platform allows the determination of rotation around the beam axis if said measurement beam is polarized. One or more target orientation indicators 110 can be used in combination with an image sensor to determine the coarse orientation of the probe, which overcomes a limitation of polarization having a 180-degree ambiguity for the roll measurement or can be used to determine additional degrees of freedom.

Figure 5:
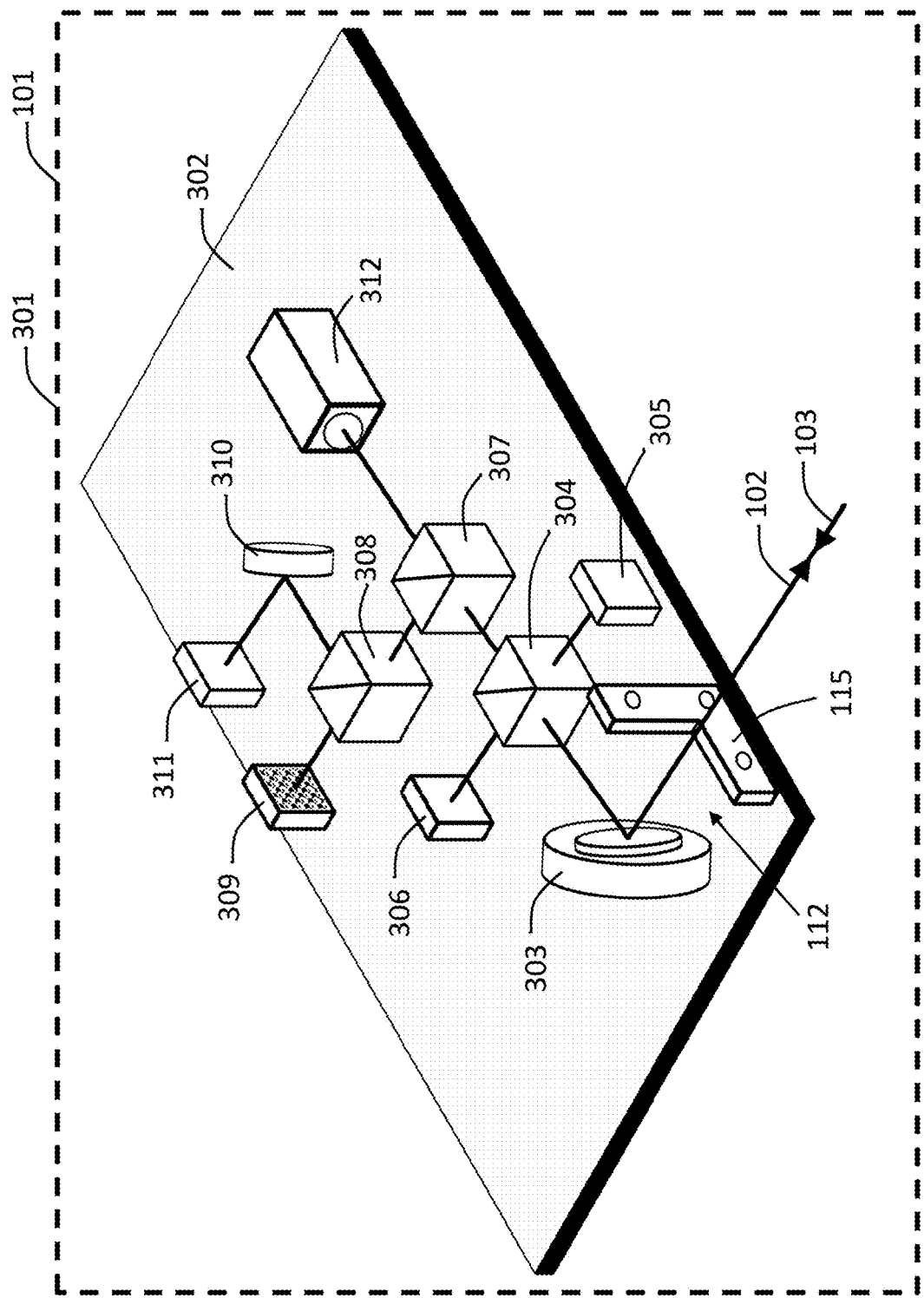
FIG. 5 shows an exemplary measurement source platform with indicators, beam steering, distance measurement with measurement and reference sensors, wavefront measurement, wavefront correction, and a PSD. Can measure 3D position of a reflective target and correct for distortions from moving air. An intelligent target can determine roll, pitch and yaw using a polarized beam from the source and the indicators.

FIG. 5 is an exemplary source electro-optical assembly 301 that is found in a measurement source 101. Said source electro-optical assembly comprises a source electro-optical mounting structure 302 to which all light sources optics and sensors are mounted in a fixed relationship to each other. A light source assembly 312 is mounted to said source electro-optical mounting structure such that it emits a beam of light toward a transverse measurement beam splitter 307 which transmits a portion of the beam toward a distance measurement beam splitter 304, which reflects a portion of the beam toward first radial reference sensor 305 and transmits a portion of light toward a source beam steering assembly 303, which can direct the beam in two dimensions through measurement source light aperture 112 as emitted measurement beam 102. Reflected measurement beam 103 passes back though said measurement source light aperture reflected by said source beam steering assembly back to said distance measurement beam splitter. A portion of the beam is reflected toward first radial measurement sensor 306, and a portion of the beam transmitted through said distance measurement beam splitter back to said transverse measurement beam splitter. A portion of this light is reflected by said transverse measurement beam splitter toward source transverse beam splitter 308, which transmits a portion of the beam to a source wavefront sensor 309, and reflect the remaining portion toward a source wavefront corrector 310. Said wavefront corrector then reflect the beam toward source beam position sensing device 311.

Figure 6:
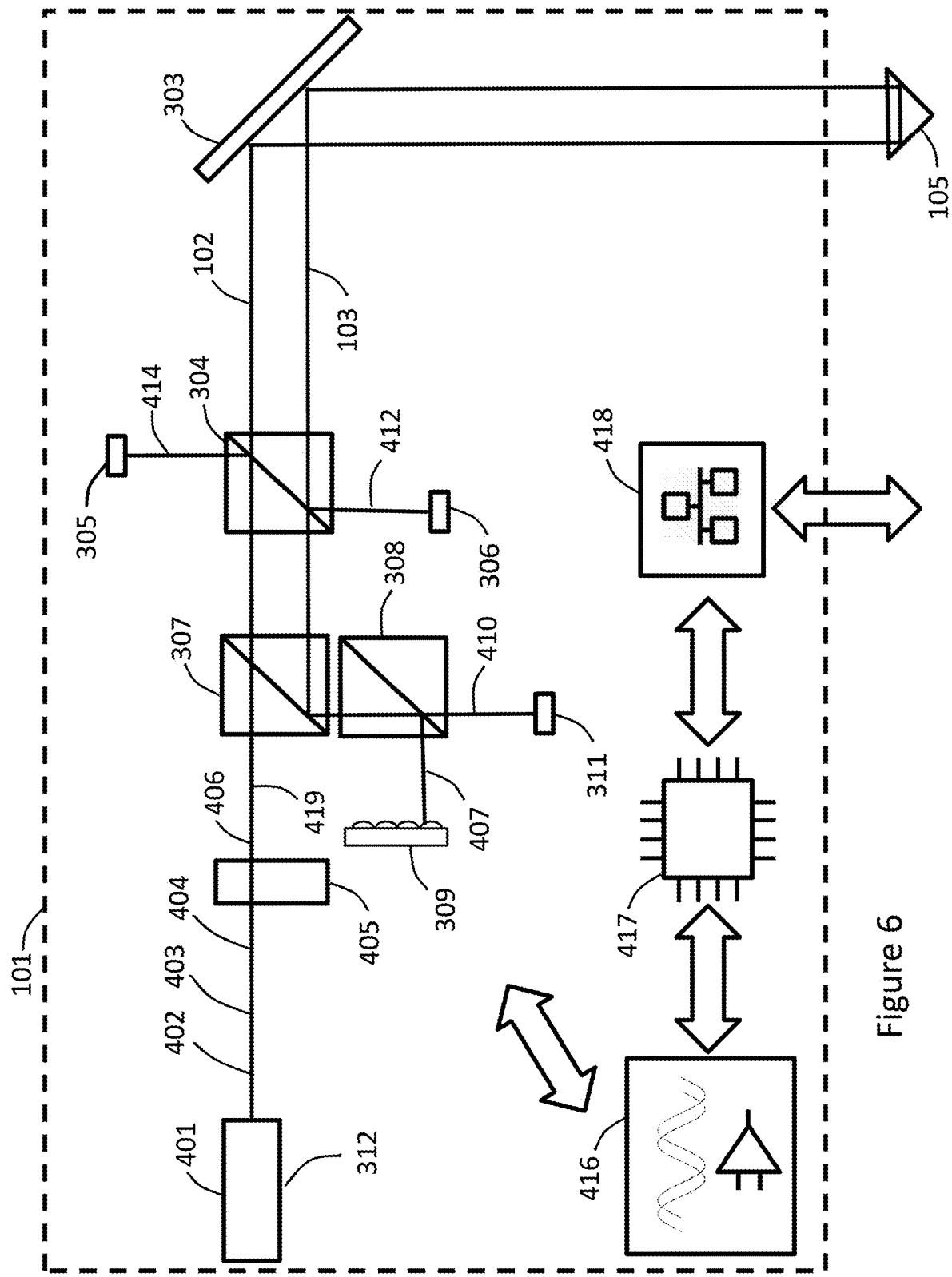
FIG. 6 shows an exemplary measurement source schematic with a light source including polarization modulation, transverse measurement beam splitter and PSD, wavefront beam splitter, wavefront measurement sensor, distance measurement beam splitter, distance measurement sensor, distance reference sensor, beam steering, reflective target, source device interface, processor, and communication system.

FIG. 6 is an exemplary schematic of a measurement source 101. A light source assembly 312 is a measurement light source 401 that emits a light beam 404, which is an intensity modulated light beam 402 and a linear polarized light beam 403. Reflected measurement beam 103 passes through distance measurement beam splitter 304 and transverse measurement beam splitter 307 and reflected to source transverse beam splitter 308. Said source transverse beam splitter reflect a portion of the beam as a wavefront distortion measurement beam 407. Said wavefront distortion measurement beam impinges on a source wavefront sensor 309, which measures any atmospheric distortions. Said source transverse beam splitter transmits a source position measurement beam 410 that represents the displacement of the apex of the reflective target 105 from the center of emitted measurement beam 102. Said source wavefront sensor and said source beam position sensing device are connected to source device interface circuit 416, which condition signals from the device and digitize them. Source processor 417 is then able to combine the digitized values to produce a position measurement that is communicated through a source communication system 418. Also shown is a polarization modulation system 405 that produces a polarization modulated light beam 406, which is a polarized light beam 419, which can be used by a light receiver to determine rotation around the axis of said light beam. Also shown is first radial reference measurement beam 414 that is reflected from said distance measurement beam splitter on the outgoing beam. Also shown is a first radial measurement beam 412, which is reflected from said distance measurement beam splitter from the beam returning from the target. Said first radial measurement beam and first radial reference measurement beam are used to calculate a distance to the target.

Figure 7:
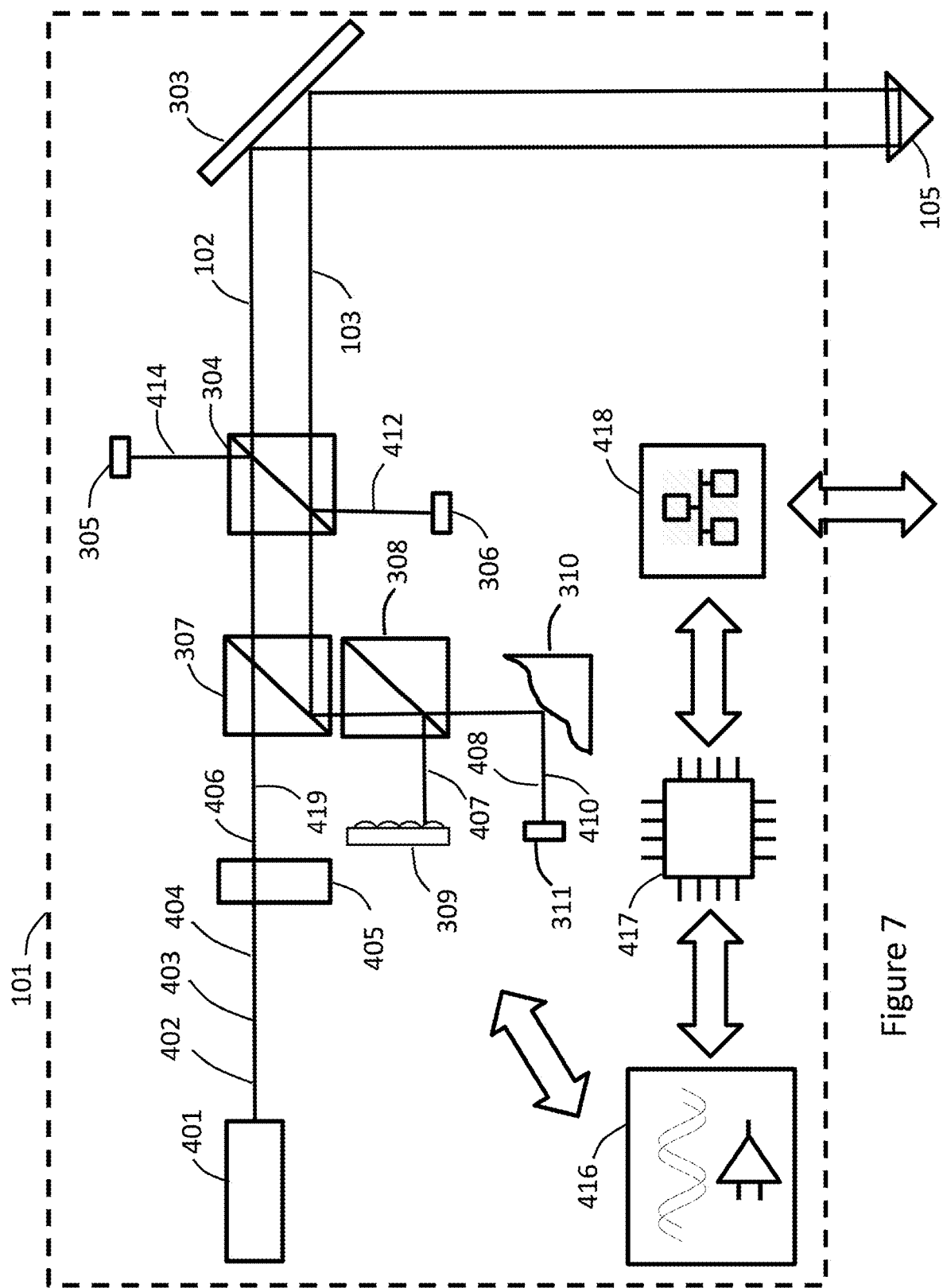
FIG. 7 shows an exemplary measurement source schematic with a light source including polarization modulation, transverse measurement beam splitter and PSD, wavefront beam splitter, wavefront measurement sensor, wavefront correction, distance measurement beam splitter, distance measurement sensor, distance reference sensor, beam steering, reflective target, source device interface, processor, and communication system.

FIG. 7 is an exemplary schematic of a measurement source 101 that has an additional source wavefront corrector 310 inserted between the source transverse beam splitter 308 and the source beam position sensing device 311, which allows to said source wavefront corrector to reshape the beam and reflect a wavefront corrected measurement beam 408. Said wavefront corrector is also connected to the source device interface circuit such that the processor can read the digitized data for source wavefront sensor 309 and then send data to said source wavefront corrector to correct the wavefront distortions.

Figure 8:
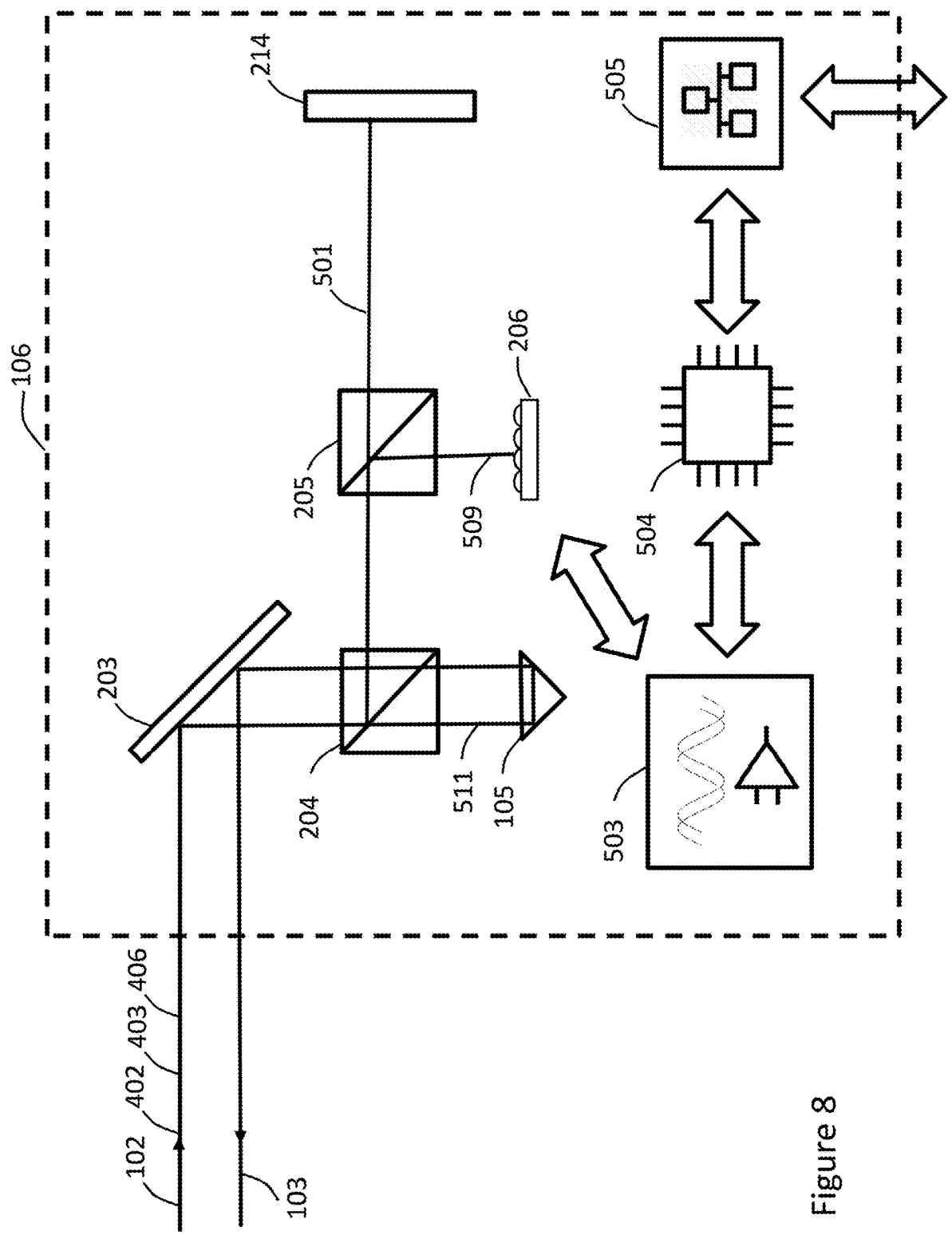
FIG. 8 shows an exemplary target schematic with beam steering, target reflector beam splitter, reflective target, wavefront beam splitter, wavefront measurement sensor, a position sensor, target device interface, and a target communication system.

FIG. 8 is an exemplary schematic of a light receiving target 106. Emitted measurement beam 102 is reflected by target reflector beam splitter 204 to target wavefront beam splitter 205. Said target wavefront beam splitter reflect a target wavefront measurement beam 509 toward target wavefront sensor 206. Said target wavefront beam splitter transmits a beam to a target position measure beam 501 sensing device 214. Said target wavefront sensor and said target beam position sensing device are connected to target device interface circuit 503, which condition signals from the device and digitize them. Target processor 504 is then able to combine the digitized values to produce a position measurement that is communicated through a target communication system 505. A portion of said emitted measurement beam is transmitted through said target reflector beam splitter as a target measurement beam 511 and impinges on reflective target 105 and is reflected back as reflected measurement beam 103.

Figure 9:
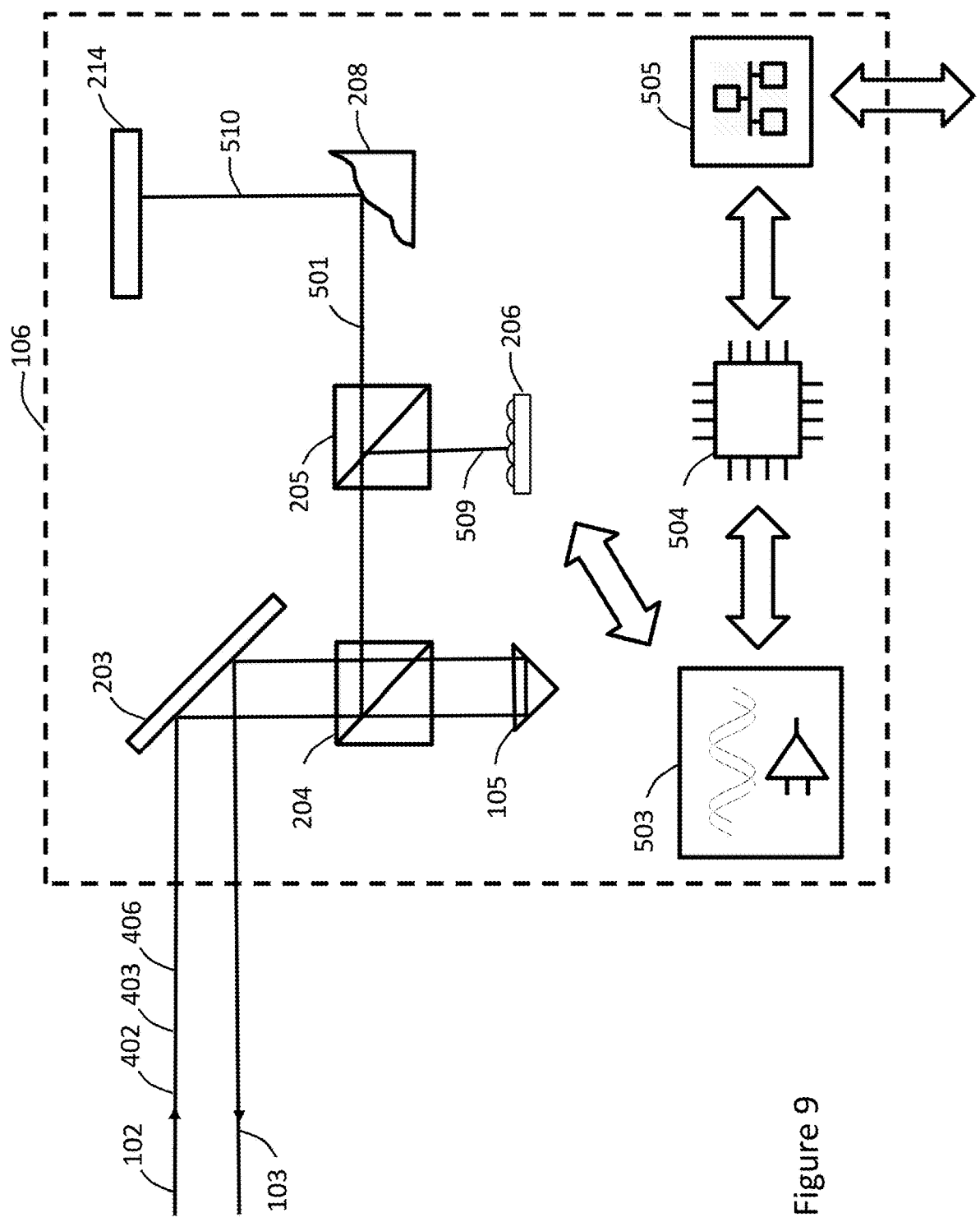
FIG. 9 shows an exemplary target schematic with beam steering, target reflector beam splitter, reflective target, wavefront beam splitter, wavefront measurement sensor, wavefront correction, a position sensor, target device interface, and a target communication system.

FIG. 9 is an exemplary schematic of a light receiving target 106 that has an additional target wavefront corrector 208 inserted between the target wavefront beam splitter 205 and the target beam position sensing device 214, which allows said target wavefront corrector to reshape the beam and reflect a target wavefront corrected measurement beam 510. Said target wavefront corrector is also connected to the target device interface circuit 503 such that the target processor 504 can read the digitized data for target wavefront sensor 206 and then send data to said target wavefront corrector to correct the wavefront distortions.

Figure 10:
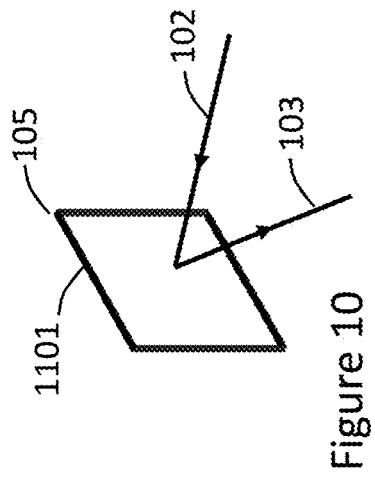
FIG. 10 shows an exemplary reflective target that is a flat mirror. Light can be reflected back toward the source, but the mirror must be nominally perpendicular to the measurement beam.

FIG. 10 is an exemplary reflective target 105, which is a flat mirror 1101.

Figure 11:
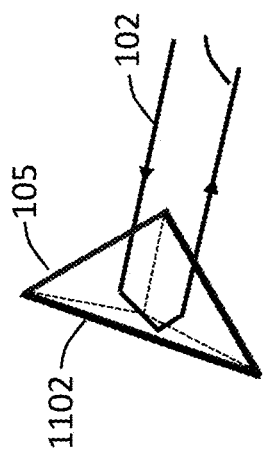
FIG. 11 shows an exemplary reflective target that is a retro reflector. The light beam reflected back is parallel to the emitted beam regardless of the orientation of the reflector.

FIG. 11 is an exemplary reflective target 105, which is a retroreflector 1102.

Figure 12:
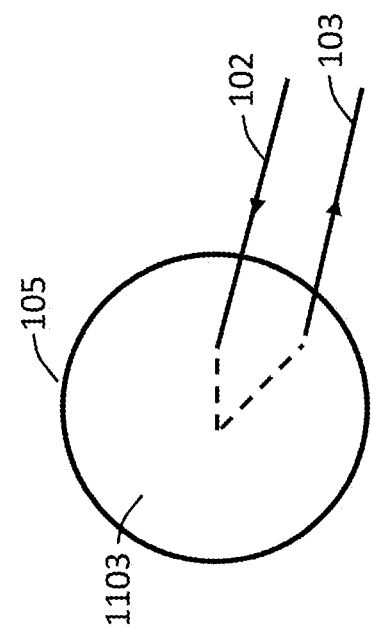
FIG. 12 shows an exemplary reflective target is a retro sphere.

FIG. 12 is an exemplary reflective target 105, which is a retrosphere 1103.

Figure 13:
FIG. 13 shows an exemplary reflective target that is an intelligent probe.

FIG. 13 is an exemplary reflective target 105, which is a light receiving target 106.

Figure 14:
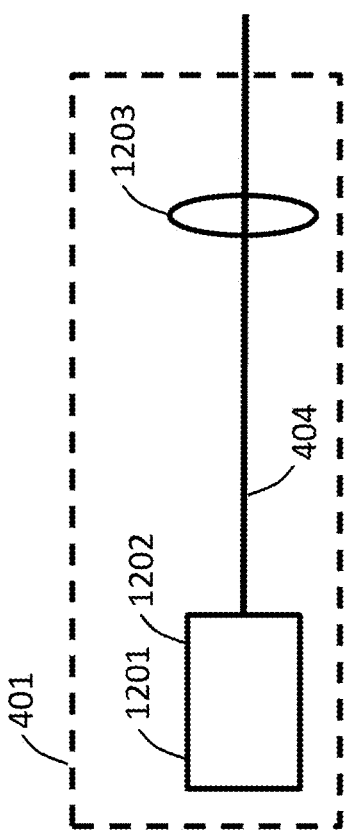
FIG. 14 shows an exemplary light source that is a laser or an LED with collimating optics. The collimating optics allow the projection of a narrow beam over a long range.

FIG. 14 is an exemplary measurement light source 401 which comprises either a light emitting diode 1201 or a laser 1202 with collimating optics 1203.

Figure 15:
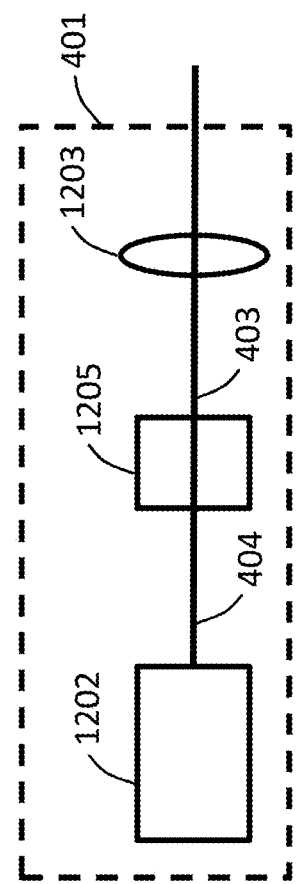
FIG. 15 shows an exemplary light source with a laser and an optical isolator such that light from the reflective target does not enter back into the laser.

FIG. 15 is an exemplary measurement light source 401 with the addition of optical isolator 1205.

Figure 16:
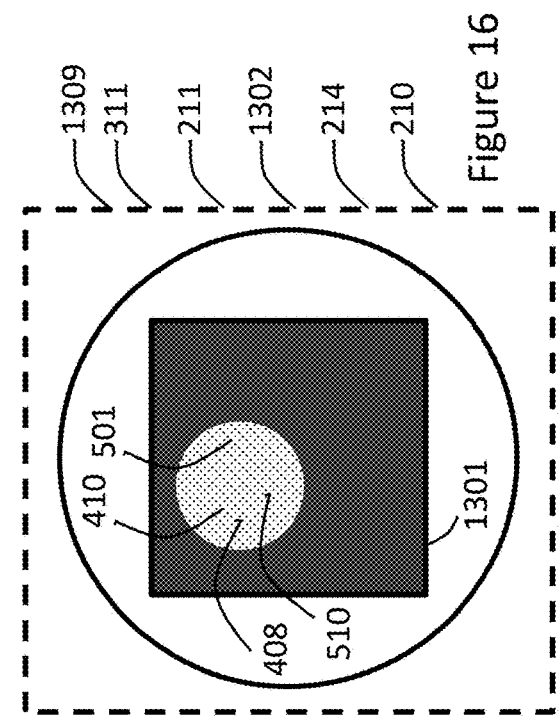
FIG. 16 shows an exemplary intensity sensor that is a lateral photo diode. The sum of the four output signals from the sensor represent the overall intensity of the beam impinging on the sensor. The difference between the output signals represents the position of the beam. The lateral photo diode is typically a single piece of silicon with a resistive layer to derive position information.

FIG. 16 is an exemplary source beam position sensing device 311 and an exemplary target beam position sensing device 214, which is a beam position sensing device 1302, which is a lateral photo diode 1301.

Figure 17:
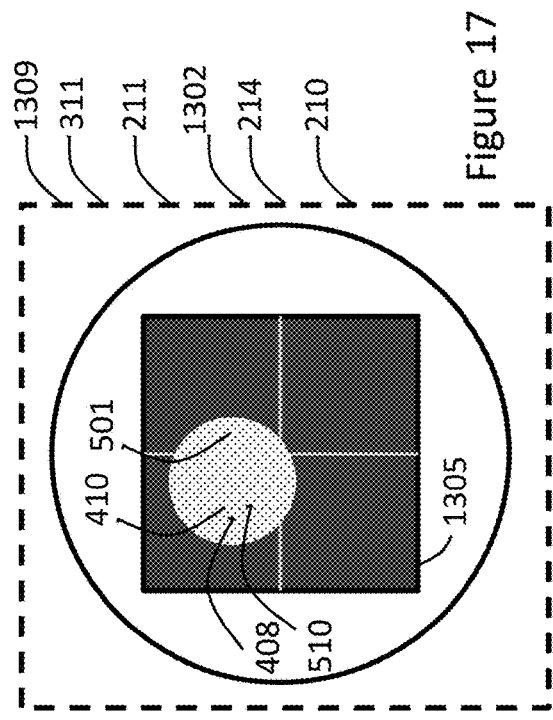
FIG. 17 shows an exemplary intensity sensor that is quadcell, which is four photo diodes. The sum of the four output signals from the sensor represent the overall intensity of the beam impinging on the sensor. The difference between the output signals represent the position the beam. The position is determined the amount of the beam impinging on each of the photo diodes.

FIG. 17 is an exemplary source beam position sensing device 311 and an exemplary target beam position sensing device 214, which is a beam position sensing device 1302, which is a quadcell 1305.

Figure 18:
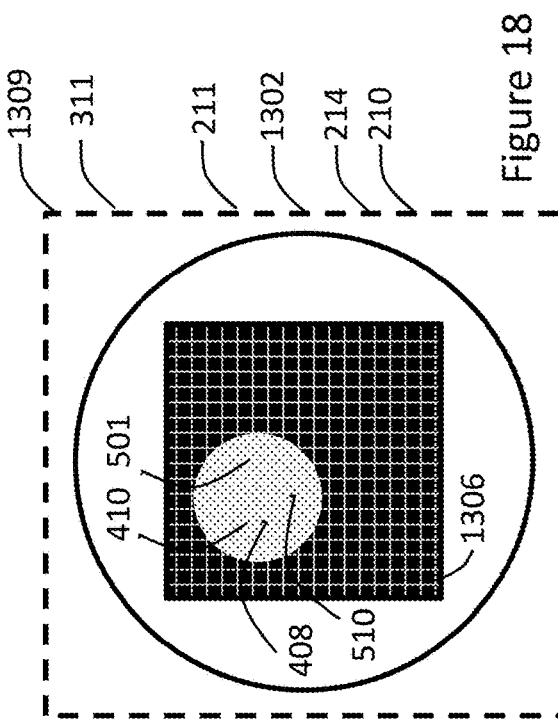
FIG. 18 shows an exemplary intensity sensor that is an image sensor such as a photo diode array of a CCD. These are typically used in digital cameras and consist of millions of photo diodes. Beam position and intensity can be determined using standard image processing techniques.

FIG. 18 is an exemplary source beam position sensing device 311 and an exemplary target beam position sensing device 214, which is a beam position sensing device 1302, which is an image sensor 1306.

Figure 19:
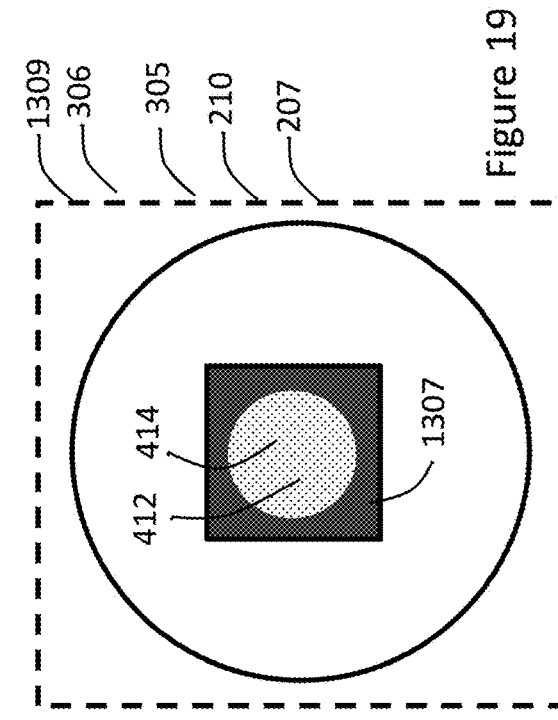
FIG. 19 is an exemplary intensity sensor, which detects intensity levels of light.

FIG. 19 is an exemplary intensity sensor 1309, which is a photo sensor 1307.

Figure 20:
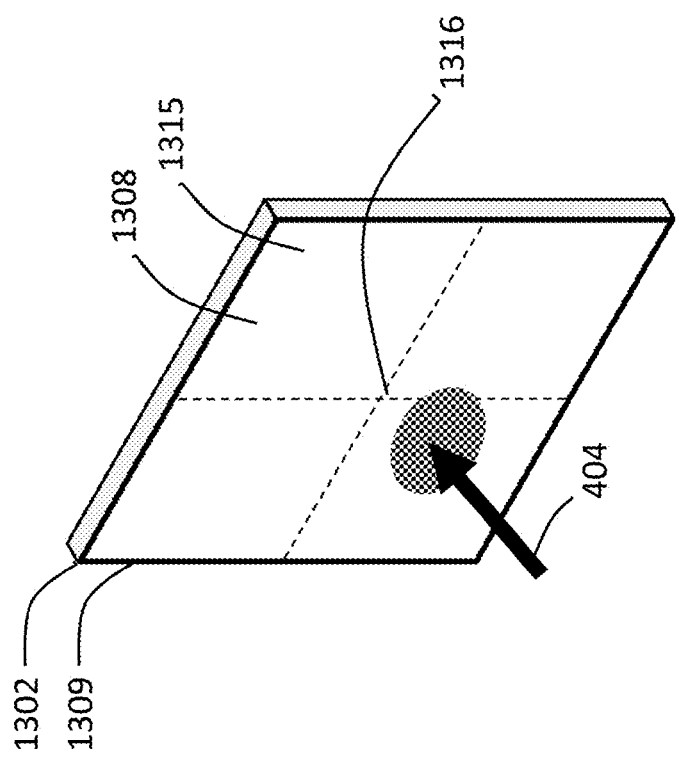
FIG. 20 is an exemplary beam position sensing device.

FIG. 20 is an exemplary beam position sensing device with a light beam 404 with a position that is measured with respect to sensor reference position 1316, which is a target beam position input 1308 or a source beam position input 1315.

Figure 21:
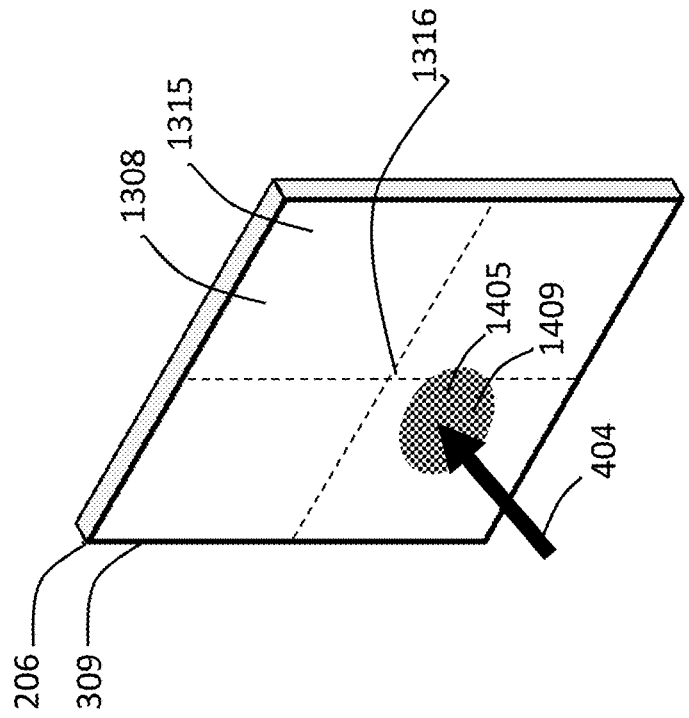
FIG. 21 is an exemplary wavefront detection sensor.

FIG. 21 is an exemplary target wavefront sensor 206 and source wavefront sensor 309 with a light beam 404 with a position that is measured with respect to sensor reference position 1316, which is a target beam position input 1308 or a source beam position input 1315.

Figure 22:
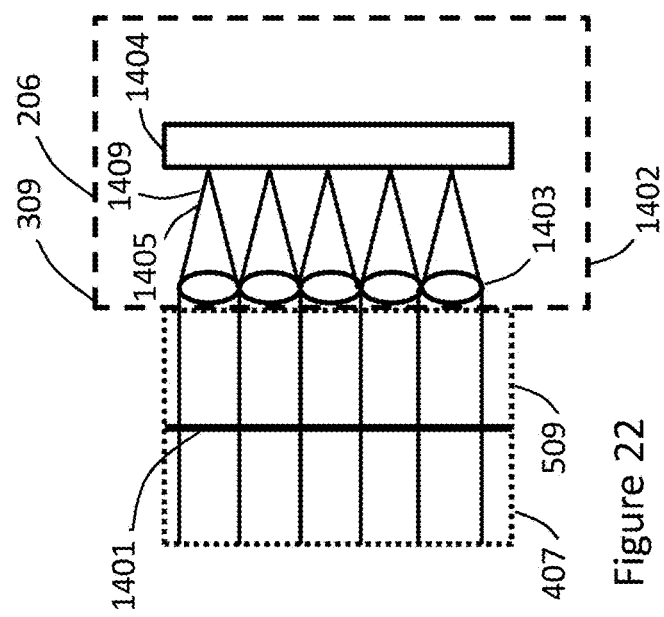
FIG. 22 Exemplary wavefront detection sensor, also referred to as a Shack-Hartman sensor. Beam passes through the micro lenses that focus the beam on the photo diode array. Micro lenses can either be glass lenses or small apertures. In this figure, the ideal wavefront is shown.
Figure 23:
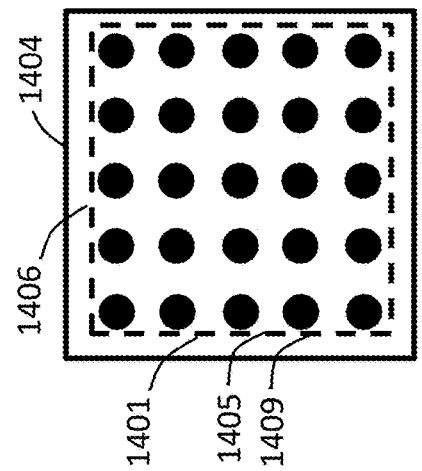
FIG. 23 is an exemplary ideal wavefront pattern projected onto the sensor.

FIG. 22 is an exemplary target wavefront sensor 206 and source wavefront sensor 309 which is a Shack-Hartmann sensor 1402. Said Shack-Hartmann sensor comprises a lenslet array 1403 positioned in front of a photodiode array 1404. A wavefront distortion measurement beam 407 or a target wavefront measurement beam 509 with an ideal wavefront 1401 passes through said lenslet array projecting an image onto said photodiode array as a target wavefront sensor input 1405 or a source wavefront sensor input 1409, which includes positional information and distortion information. The light beam 404 produces beam spot #### on the sensor having a boundary FIG. 23 shows an exemplary ideal wavefront pattern 1406 related to the ideal wavefront 1401.

Figure 24:
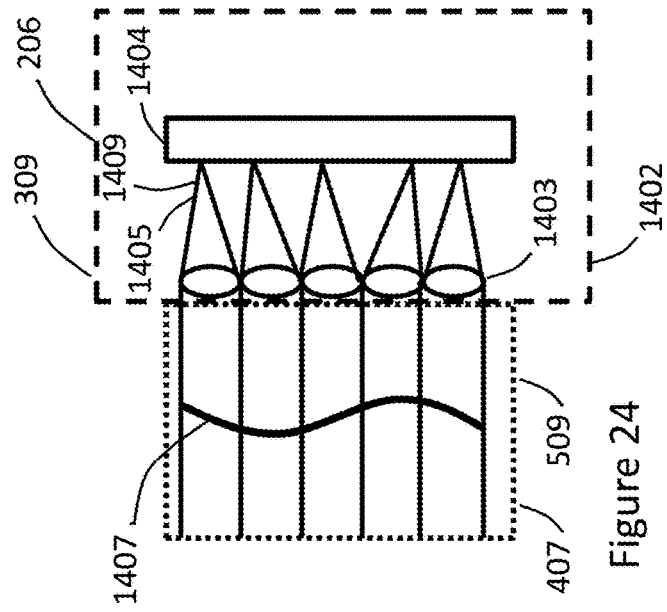
FIG. 24 is an exemplary wavefront detection sensor with a distorted wavefront pattern.

FIG. 24 is Shack-Hartman sensor 1402 with a distorted wavefront 1407.

Figure 25:
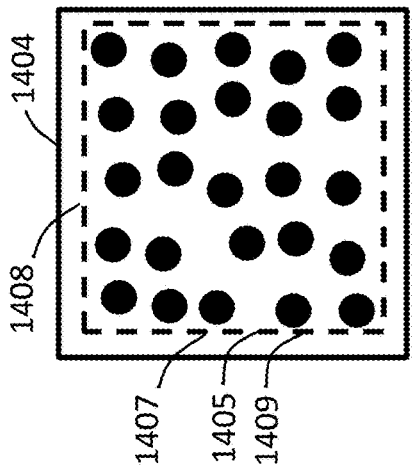
FIG. 25 is an exemplary distorted wavefront pattern projected onto the sensor.

FIG. 25 is a distorted wavefront pattern 1408 representing distortion information of the wavefront data.

Figure 26:
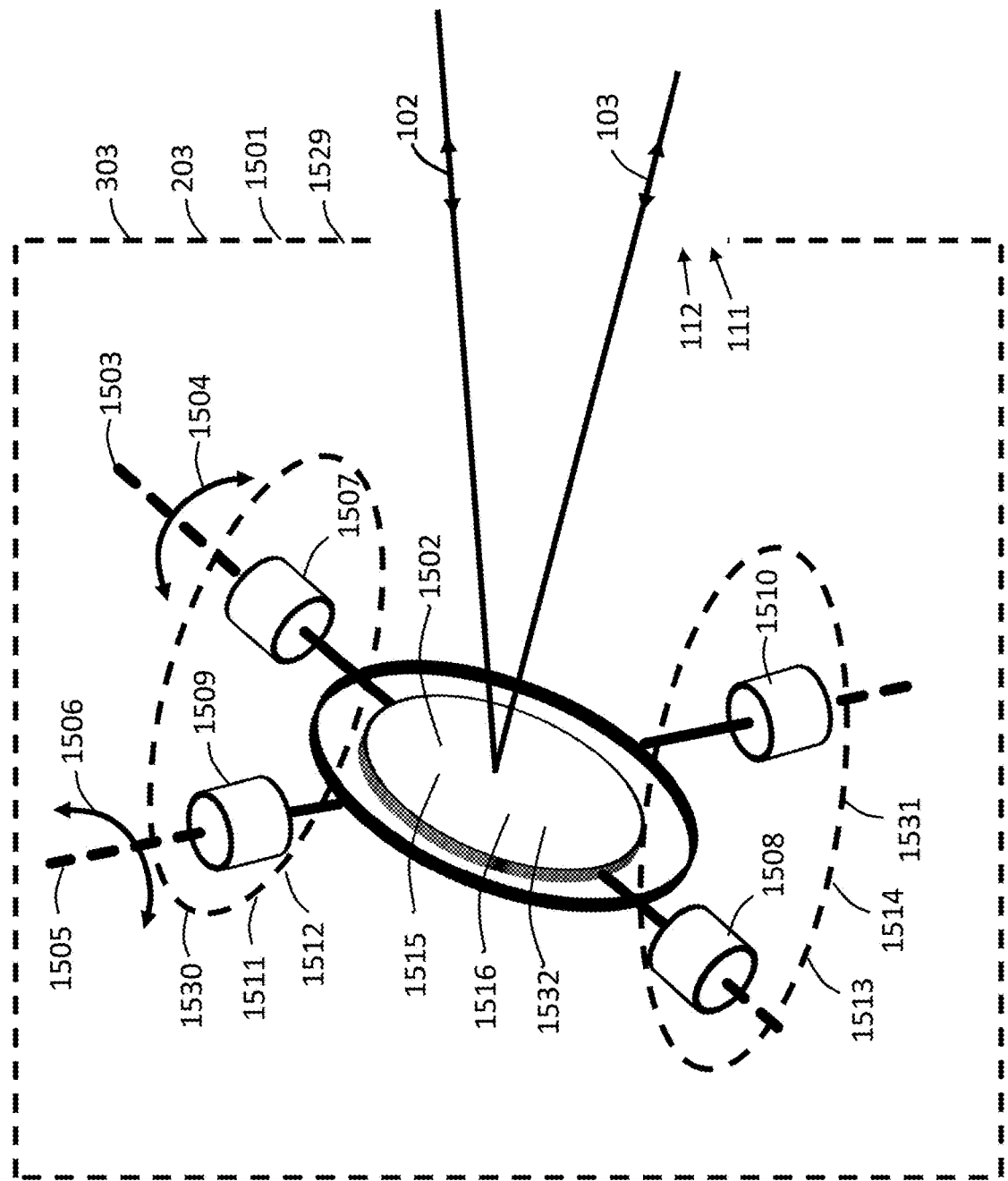
FIG. 26 is an exemplary target beam steering assembly and source beam steering assembly.

FIG. 26 is an exemplary dual-axis mirror assembly 1501, which is a beam steering assembly 1529, comprising a first rotating mirror 1502, one or more optic positioners 1512, one or more optic position sensors 1514, a first axis of rotation 1503, and a second axis of rotation 1505. Said first rotating mirror is one or more beam steering optics 1516. Said one or more optic positioners are comprised of first axis mirror rotator 1507, that rotates said one or more beam steering optics in a first axis direction of rotation 1504 about said first axis of rotation. Said one or more optic positioners further comprises second axis mirror rotator 1509, that rotates said one or more beam steering optics in a second axis direction of rotation 1506 about said second axis of rotation. Said one or more optic position sensors comprises a first axis angle sensor 1508 that measures said first axis direction of rotation and a second axis angle sensor 1510 that measures said second axis direction of rotation. Said beam steering assembly may be either a target beam steering assembly 203 or a source beam steering assembly 303. Said one or more optic positioners is either a target beam steering motor system 1511 or a source beam steering motor system 1530. Said one or more optic position sensors is either a target beam steering position measurement system 1513 or a source beam steering position measurement system 1531. Said one or more beam steering optics is either a target beam steering optic system 1515, or a source beam steering optic system 1532.

Figure 27:
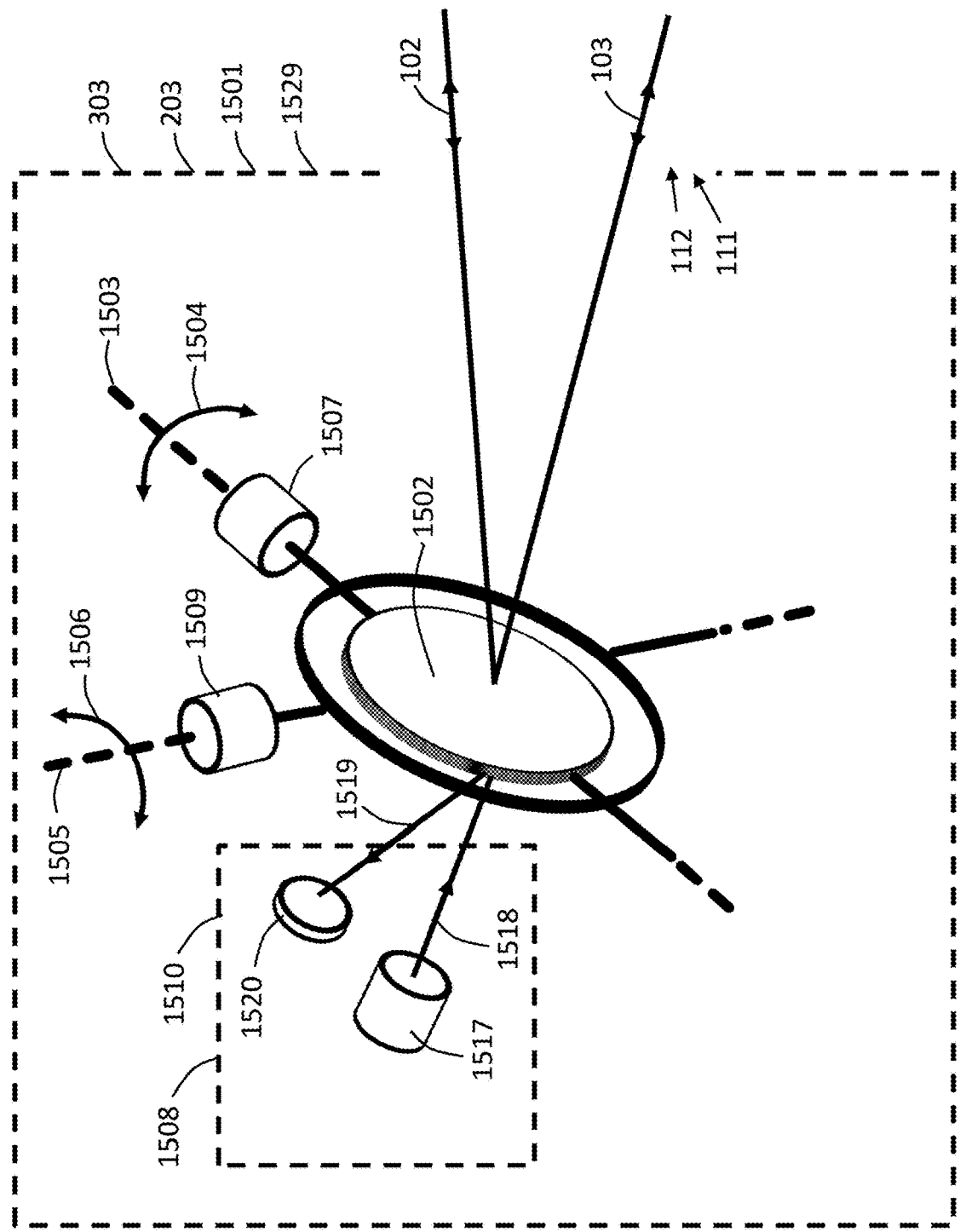
FIG. 27 is an exemplary target beam steering assembly and source beam steering assembly.

FIG. 27 is an exemplary dual axis mirror assembly 1501 where the first angle sensor 1508 second axis angle sensor 1510 comprises a mirror position laser 1517, a mirror position laser output beam 1518, and a mirror position reflected beam 1519 that impinges on a mirror position sensing device 1520 that uses the beam position to determine first axis direction of rotation 1504 and second axis direction of rotation 1506.

Figure 28:
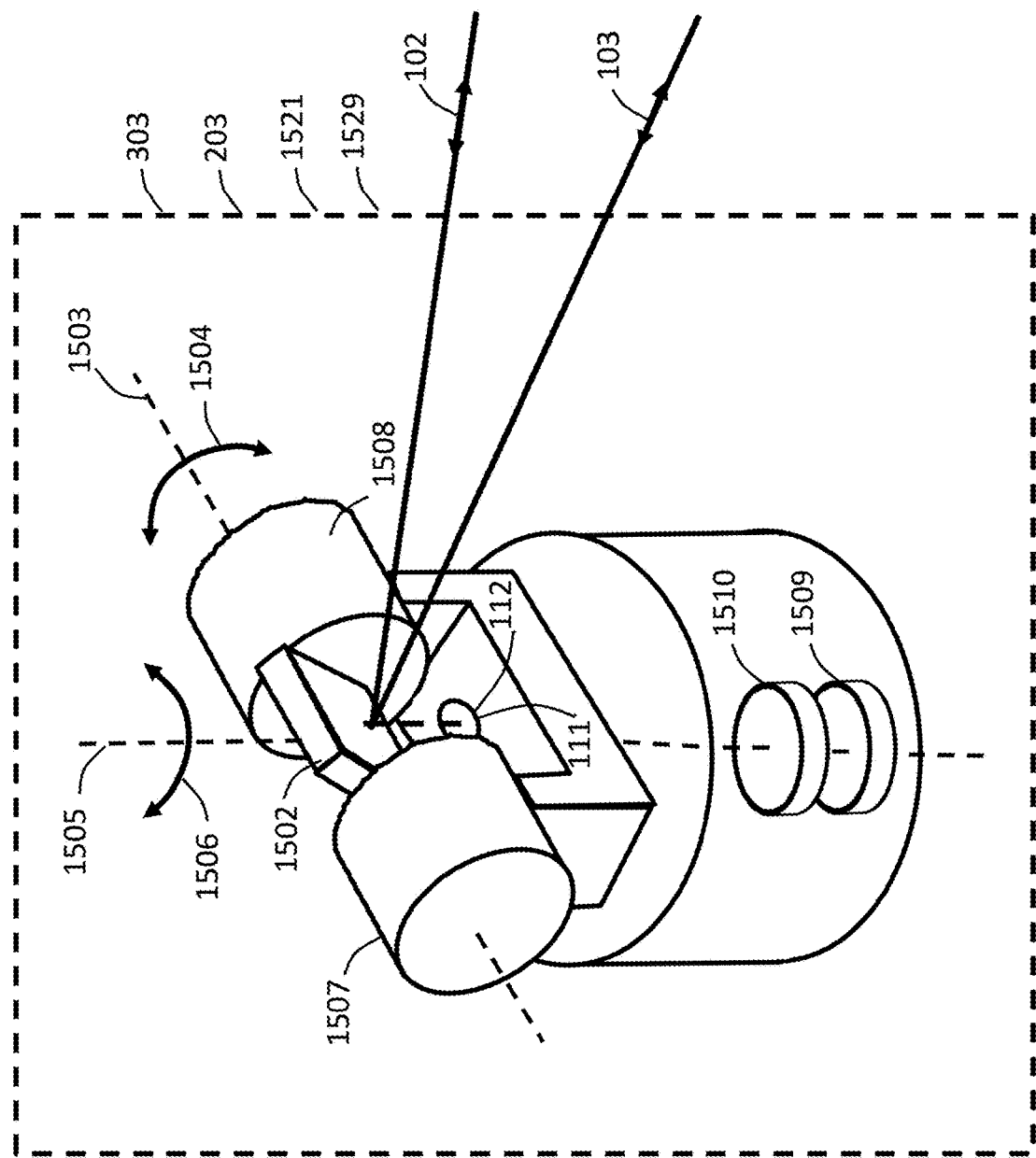
FIG. 28 is an exemplary target beam steering assembly and source beam steering assembly.

FIG. 28 is an exemplary beam steering assembly 1529 that is a gimbal mirror assembly 1521.

Figure 29:
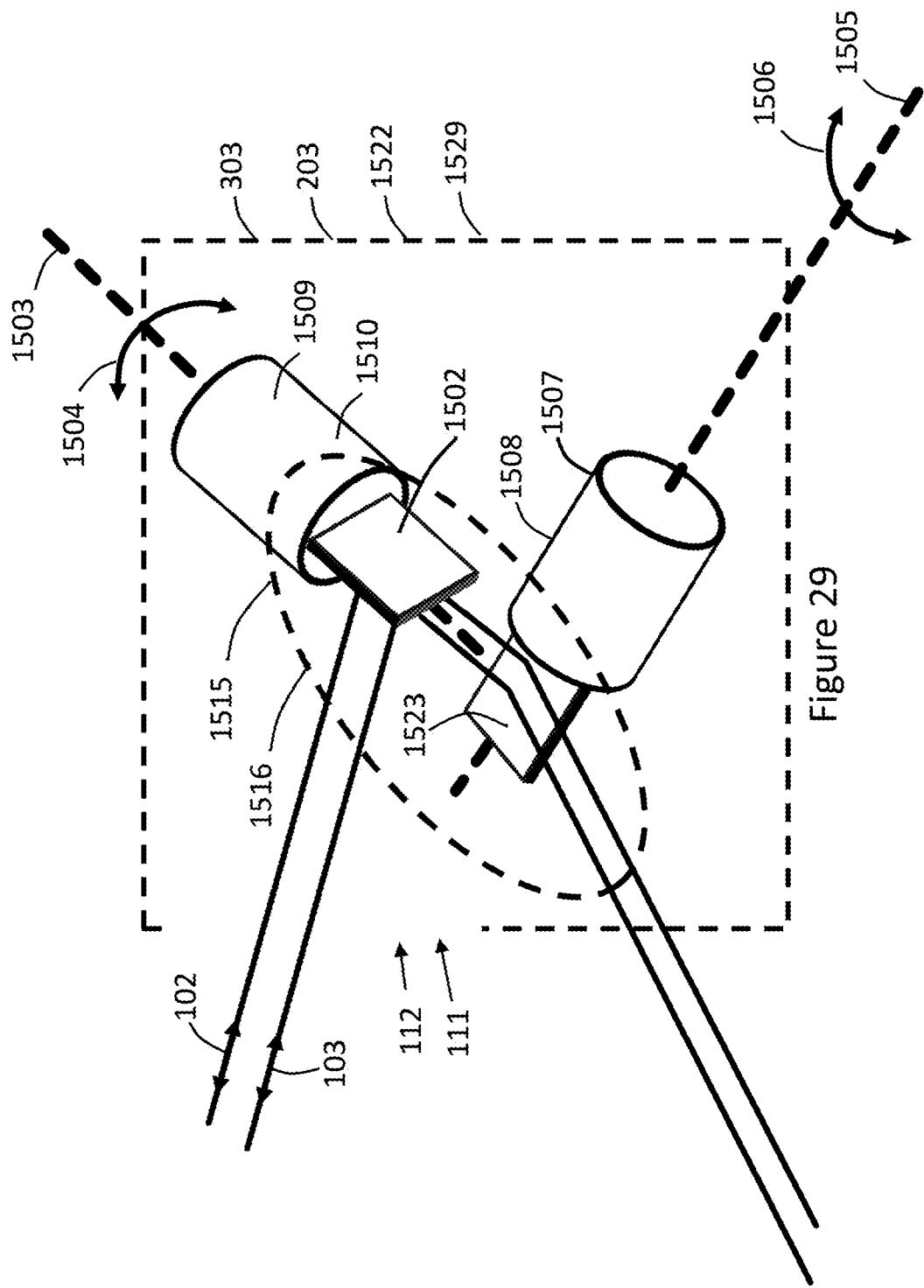
FIG. 29 is an exemplary target beam steering assembly and source beam steering assembly.

FIG. 29 is an exemplary beam steering assembly 1529 that is a dual mirror assembly 1522 where one or more beam steering optics 1516 comprises a first rotating mirror 1502 and a second rotating mirror 1523.

Figure 30:
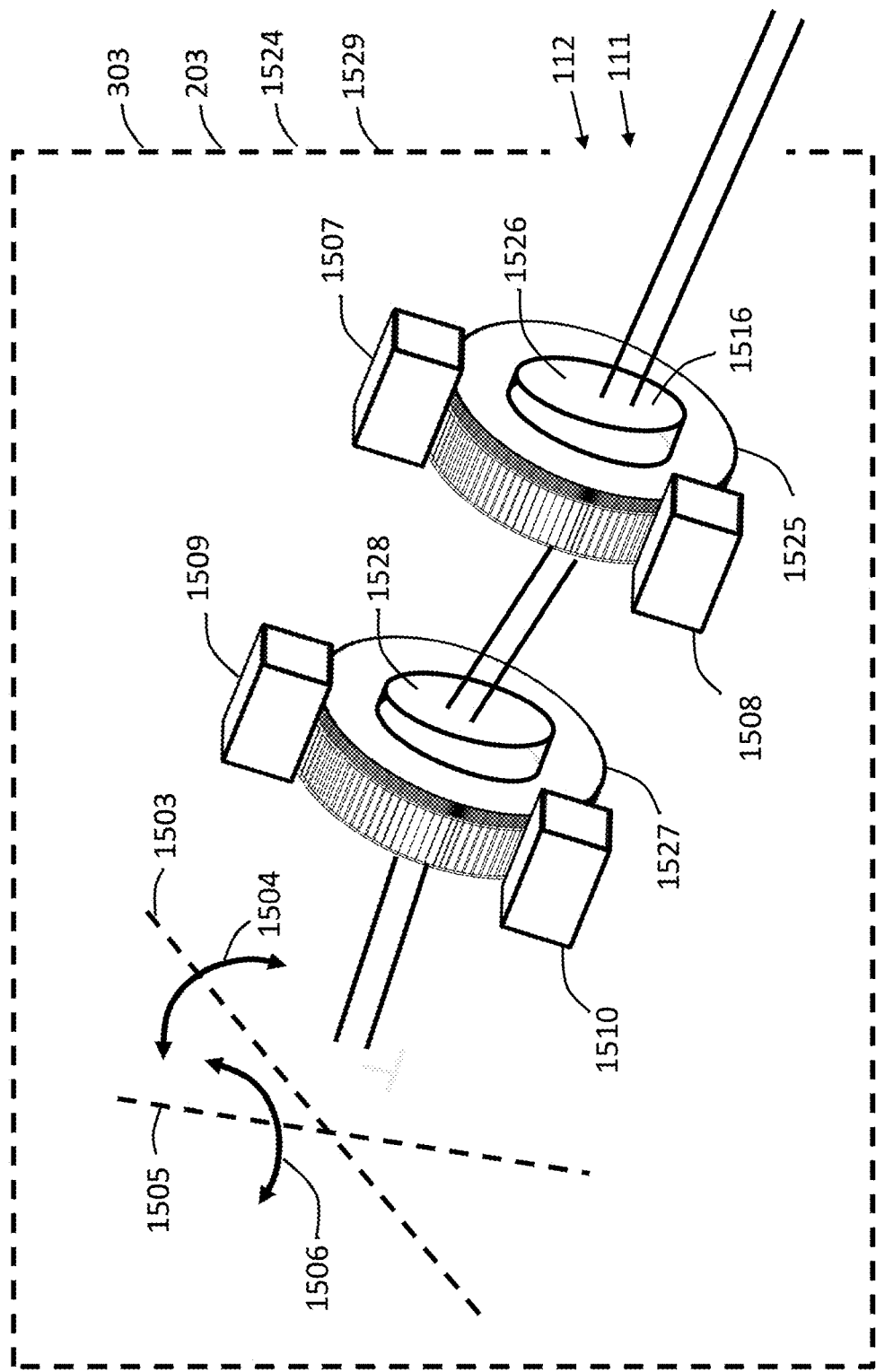
FIG. 30 is an exemplary target beam steering assembly and source beam steering assembly.

FIG. 30 is an exemplary beam steering assembly 1529 is a dual refracting optic assembly 1524 comprising a first rotating refracting optic assembly 1525 and a second rotating refracting optic assembly 1527 wherein one or more beam steering optics 1516 comprises a first refracting optic 1526 and a second refracting optic 1528 capable of directing a light beam at different angles determined by the rotation of the optic around the axis of the beam. An example would be a wedge prism.

Figure 31:
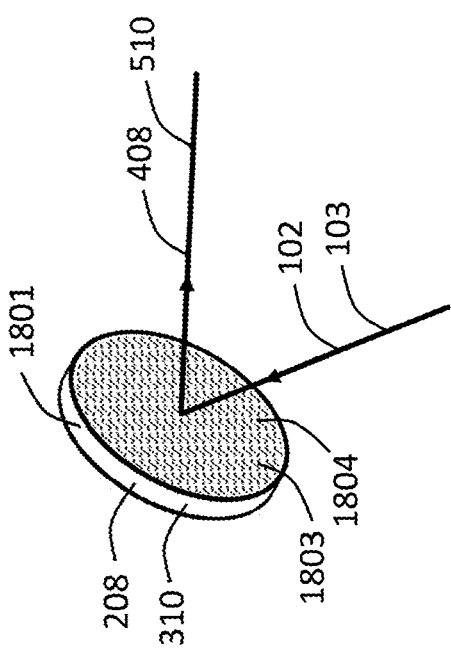
FIG. 31 shows an exemplary wavefront corrector that is a deformable mirror.

FIG. 31 is an exemplary target wavefront corrector 208, which is also a target wavefront correcting optic 1803 and exemplary source wavefront corrector 310 which is also a source wavefront correcting optic 1804, all of which is a deformable mirror 1801 where an emitted measurement beam 102 or a reflected measurement beam 103 with a distorted wavefront is reflected with an ideal wavefront.

Figure 32:
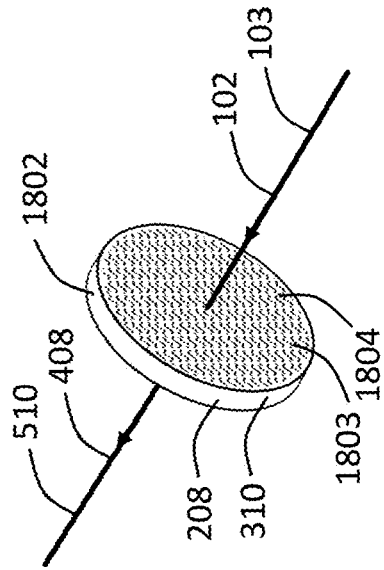
FIG. 32 shows an exemplary wavefront corrector that is a liquid crystal array.

FIG. 32 is an exemplary target wavefront corrector 208, which is also a target wavefront correcting optic 1803 and exemplary source wavefront corrector 310 which is also a source wavefront correcting optic, all of which is a liquid crystal array 1802 where an emitted measurement beam 102 or a reflected measurement beam 103 with a distorted wavefront and transmitted with an ideal wavefront.

Figure 33:
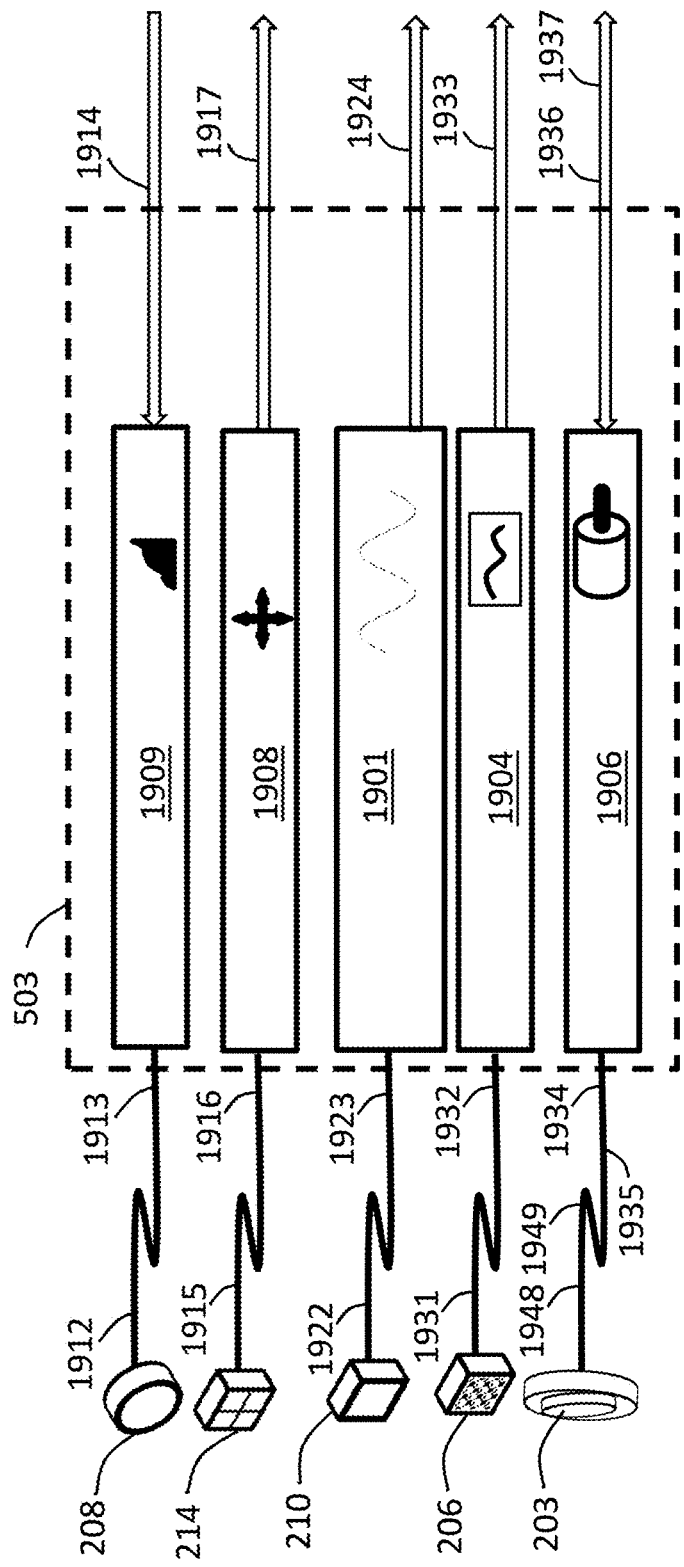
FIG. 33 shows an exemplary target device interface circuit.

FIG. 33 is an exemplary target device interface circuit. A wavefront corrector interface circuit 1909 has a target input wavefront correction data 1914 that is converted to target wavefront correction signal output 1913 that connects to the target wavefront correcting signal input 1912 used to control the configuration of the target wavefront corrector 208. Target beam position sensing device 214 has a one or more target beam intensity signal outputs 1915 connected to a target beam position signal input 1916 to exemplary target beam position sensing device interface 1908 whose output is target beam position output data 1917 representing the position of a light beam on the sensor. A target wavefront sensor 206 has a target wavefront signal output 1931 connected to target wavefront signal input 1932 of target wavefront sensor conditioning circuit 1904 with a target output wavefront data 1933 representing a wavefront of the measurement. A target beam steering assembly 203 has target beam steering position signal output 1948 connected to target beam steering position input 1934 for the target beam steering interface circuit 1906 to generate target output beam steering position data 1936 representing the orientation of the assembly. The target beam steering interface circuit 1906 also has a target input beam steering motor data 1937 that is used to generate a target beam steering motor signal output 1935 connected to a target beam steering motors signal input 1949 which causes the target beam steering assembly 203 to change its orientation. First beam intensity sensor 210 has one or more first intensity signal outputs 1922 connected to a first intensity signal input 1923 of target first intensity interface 1901 with a first intensity data output 1924.

Figure 34:
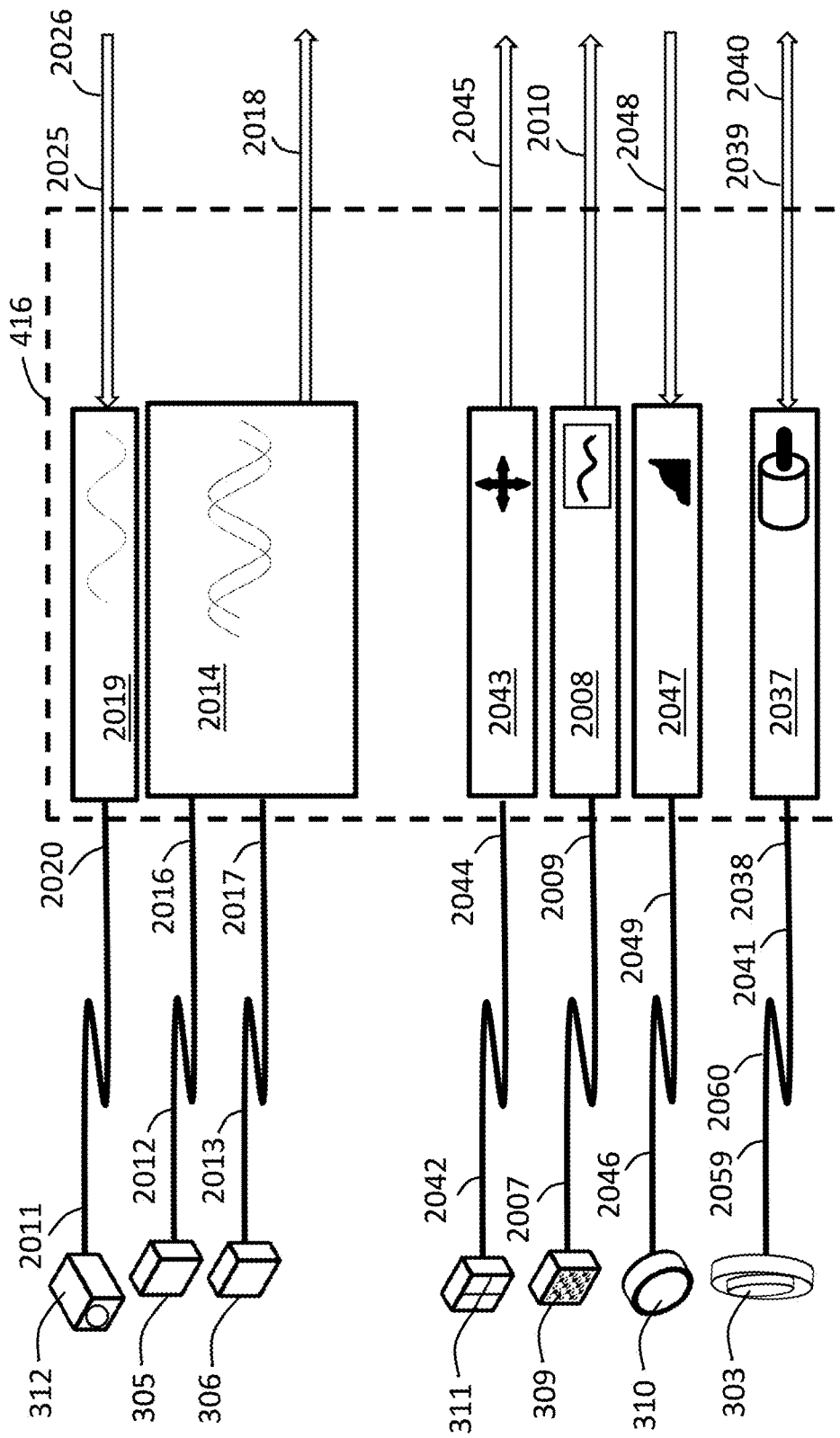
FIG. 34 shows an exemplary source device interface circuit.

FIG. 34 is an exemplary source device interface circuit 416. A modulation data input 2025 is connected to a modulation data modulation circuit 2019 with modulation output 2020 that connects to modulation input 2011 of light source assembly 312, which is used to change the output intensity as directed. A first radial reference sensor 305 with a first radial reference signal output 2012 and a first radial measurement sensor 306 with a first radial measurement signal output 2013 are connected to first radial reference signal input 2016 first radial measurement signal 2017 respectively of a first phase comparison circuit 2014 which outputs an output first phase difference data 2018 representing a distance to a target. Source beam position sensing device 311 has a one or more source beam intensity signal outputs 2042 connected to a source beam position signal input 2044 to source beam position sensing device interface 2043 whose output is source beam position data output 2045 representing the position of a light beam on the sensor. A source wavefront sensor 309 has a source wavefront signal output 2007 connected to source wavefront signal input 2009 of source wavefront sensor conditioning circuit 2008 with a source output wavefront data 2010 representing a wavefront of the measurement. A source wavefront corrector interface circuit 2047 has a source input wavefront correction data 2048 that is converted to source wavefront correction signal output 2049 that connects to the source wavefront correcting signal input 2046 use to control the configuration of the source wavefront corrector 310. A source beam steering assembly 303 has source beam steering position signal output 2060 connected to source beam steering position input 2038 for the source beam steering interface circuit 2037 to generate source output beam steering position data 2039 representing the orientation of the assembly. The source beam steering interface circuit 2037 also has a source input beam steering motor data 2040 that is used to generate a source beam steering motor signal output 2041 connected to a source beam steering motors signal input 2059 which causes the source beam steering assembly 303 to change its orientation.

Figure 35:
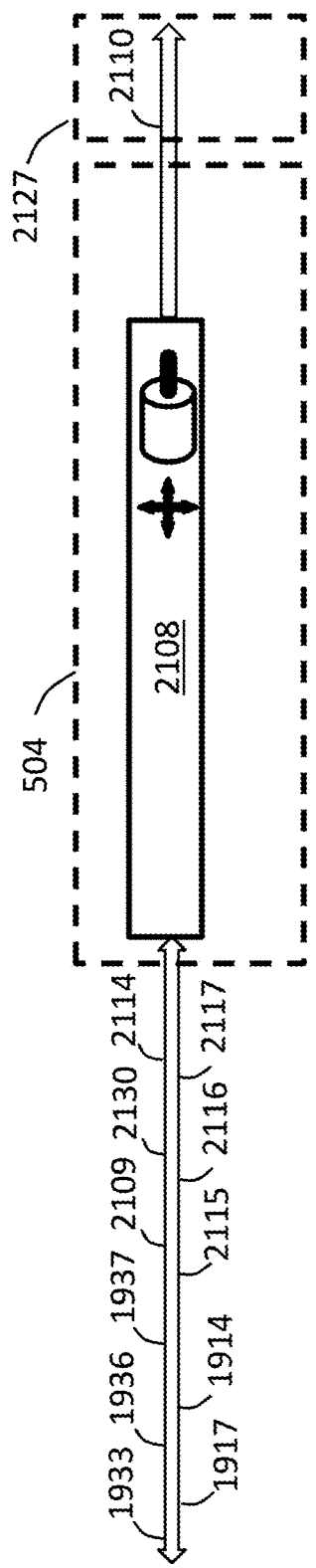
FIG. 35 is an exemplary target processor with algorithms to process transverse measurement and control.

FIG. 35 is an exemplary target processor 504 with one or more measurement data outputs 2127. A target input wavefront data 2109, a first beam position data input 2114, target input beam steering position data 2115, and a target beam position data input 2117 are inputs to a target transverse measurement and control algorithm 2108 produces a target output transverse measurement 2110, a target output beam steering motor data 2116, and target output wavefront correction data 2130.

Figure 36:
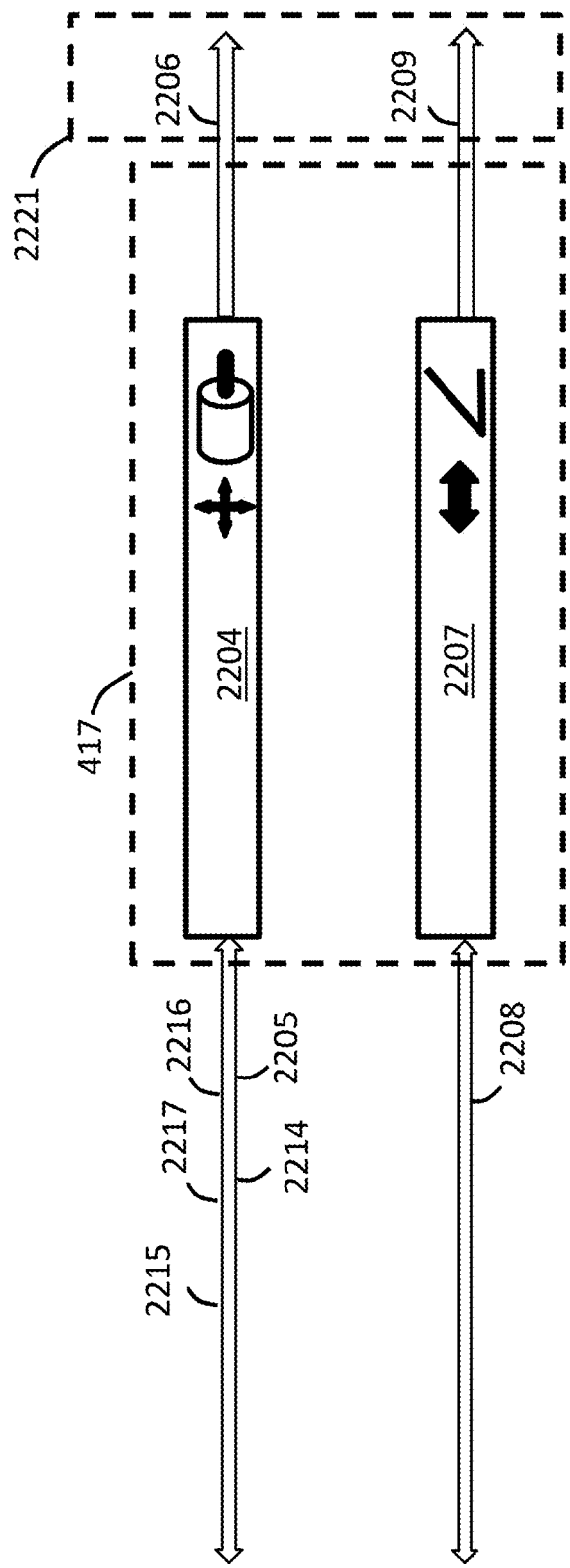
FIG. 36 shows an exemplary source processor.

FIG. 36 is an exemplary source processor 417 with one or more source measurement data outputs 2221. A source transverse measurement and control algorithm 2204 with a source input wavefront data 2205, a source beam position data input 2216, and a source input beam steering position data 2214 produce a source output transverse measurement 2206, a source output beam steering motor data 2215, and a source output wavefront correction data 2217. A source radial measurement and control algorithm 2207 with an input first phase difference data 2208 calculates a source radial measurement 2209.

FIG. 37 is an exemplary communication system that is a user interface 3301 comprising a display 3302 to show measurement data and buttons 3303 to process user input.

FIG. 38 is an exemplary wired communication system 3304 comprising serial communications such as RS232 or SPI 3306, Ethernet 3307, and USB 3308 capable of communicating with a wired receiving device 3309.

FIG. 39 is an exemplary wireless communication system 3310 comprising Bluetooth communications 3312 and WiFi Communications 3313 communicating with a wireless receiving device 3314.

Figure 40:
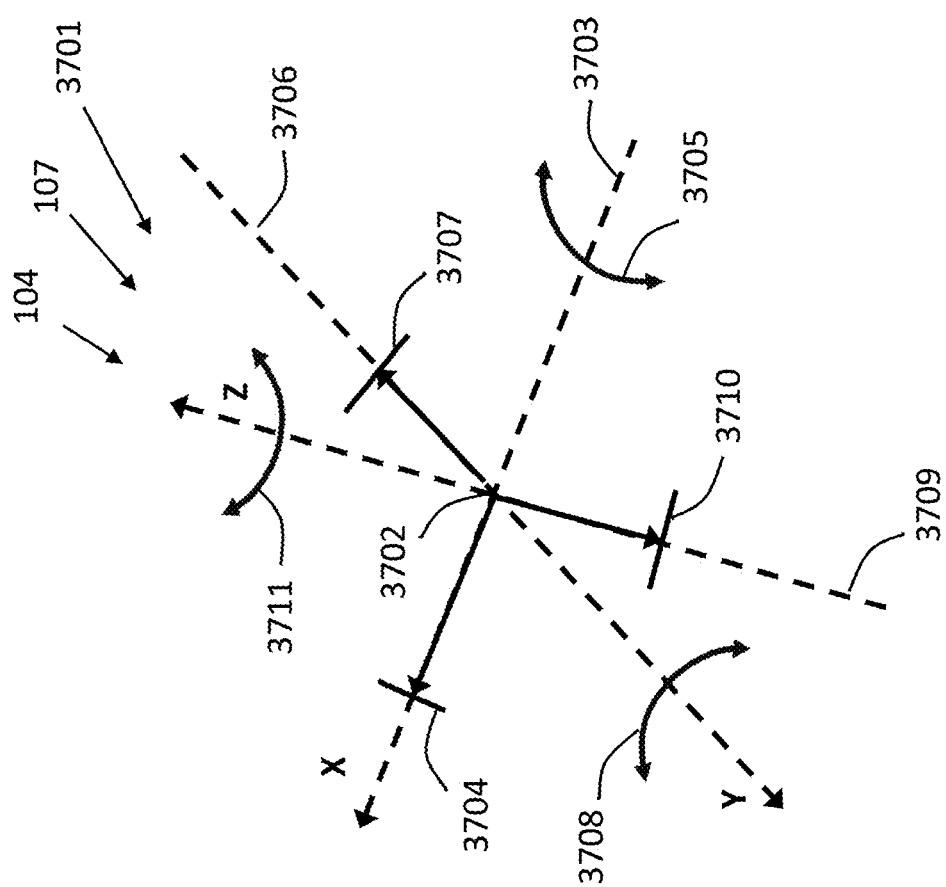
FIG. 40 shows an exemplary Cartesian coordinate system.

FIG. 40 shows an exemplary cartesian coordinate system 3701 with a x-axis 3703, y-axis 3706, and a z-axis 3709. All 3 axes are mutually perpendicular and intersect at the measurement origin 3702. Measurements in this coordinate system consist of a distance from the measurement origin along x-axis (DX) 3704, distance from measurement origin along y-axis (DY) 3707, distance from measurement origin along z-axis (DZ) 3710, rotation around x-axis (RX) 3705, rotation around y-axis (RY) 3708, and around z-axis (RZ) 3711.

Figure 41:
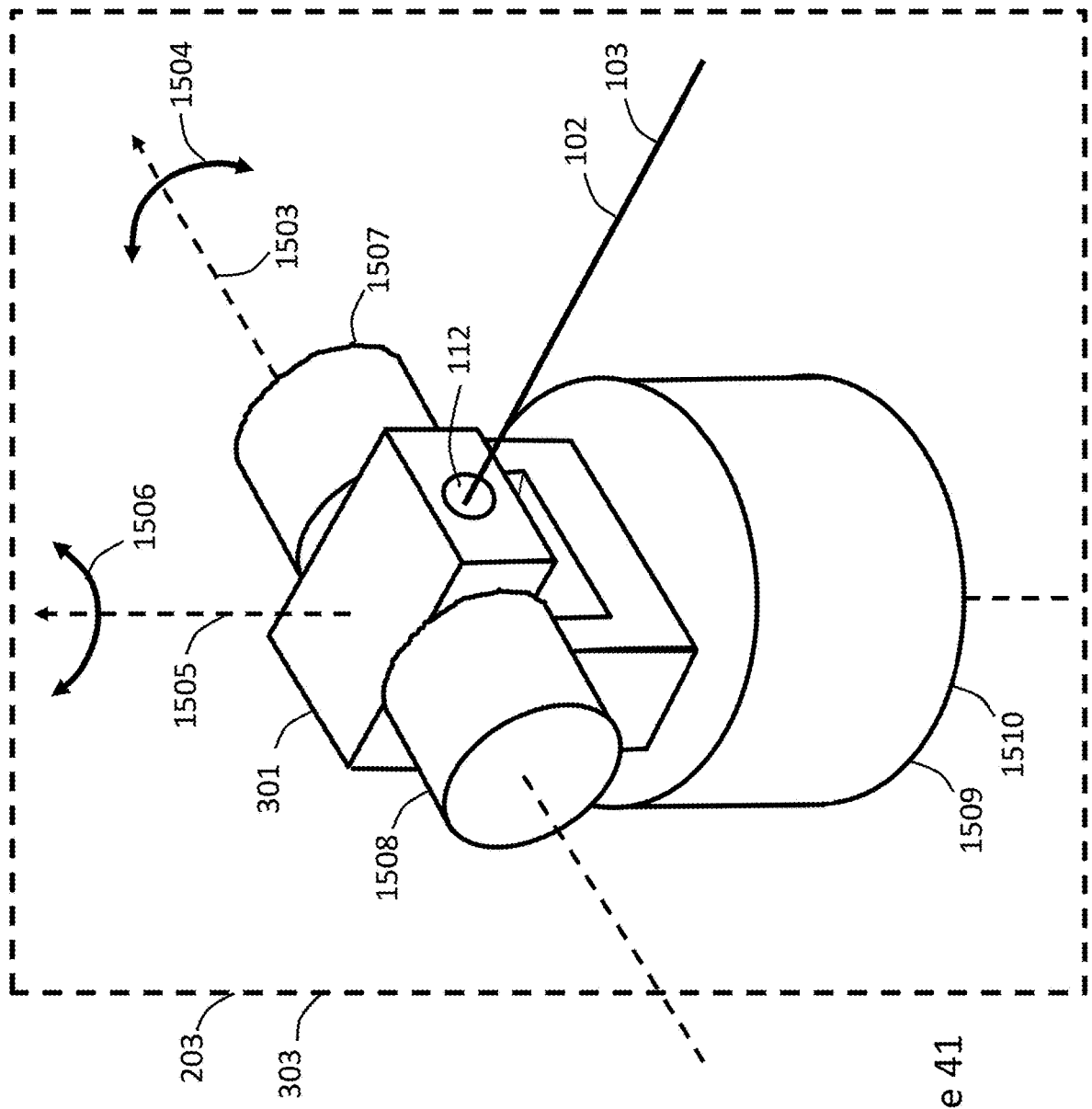
FIG. 41 is an exemplary source beam steering assembly.

FIG. 41 shows an exemplary target beam steering assembly 203 and an exemplary source beam steering assembly 303. Here, the source electro-optical assembly 301 is mounted such that the entire platform can be rotated about two axes.

Throughout the description of the invention, we place adjectives in front of the term measurement beam in an effort to show how a light beam propagates through the various optics. Those skilled in the art will recognize that all of the optics have a known behavior and therefore all sensor readings can be equated back to a single light beam emitted from the measurement source, so we may also for simplicity refer a light beam impinging on a sensor as the measurement beam. A measurement beam may be a reflected measurement beam, a split measurement beam, a corrected measurement beam, and a refocused measurement beam.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

REFERENCES

The reference listed below are herein incorporated by reference in their entirety:

U.S. Pat. No. 4,790,651 Tracking Laser Interferometer, Brown et al.;
U.S. Pat. No. 4,714,339 Three and Five Axis Laser Tracking Systems, Lau, et al.;
U.S. Pat. No. 5,305,091 Optical Coordinate Measuring System for Large Objects, Gelbart et al.;
U.S. Pat. No. 5,530,549 Probing Retroreflectors and Methods of Measuring Surfaces Therewith, Brown;
U.S. Pat. No. 6,049,377 Five-Axis/Six-Axis Laser Measuring System, Lau, et al.;
U.S. Pat. No. 6,675,122 Indirect Position Determination with the Aid of A Tracker,
U.S. Pat. No. 7,230,689 Multi-Dimensional Measuring System, Lau;
U.S. Pat. No. 7,312,862 Measurement System for Determining Six Degrees of Freedom of an Object;
U.S. Pat. No. 7,576,836 Camera Based Six Degree-of-Freedom Target Measuring and Target Tracking Device, Bridges;
U.S. Pat. No. 8,670,114 Device and Method for Measuring Six Degrees of Freedom, Bridges, et al.;
U.S. Pat. No. 8,773,667 Sphere Bar Probe, Edmonds, et al.
European Patent 0880674 A System for Point-By-Point Measuring of Spatial Coordinates. Pettersen;
U.S. Pat. No. 9,976,947, Position Measurement Device, John M Hoffer Jr.;
U.S. provisional patent application No. 63/016,964 to John M. Hoffer, Jr., filed on Apr. 28, 2020 and entitled Light Receiving Measurement Device with the Ability to Measure One or More Degrees of Freedom.

OTHER PUBLICATIONS

R. Paschotta, article on 'Shack-Hartmann wavefront sensors' in the Encyclopedia of Laser Physics and Technology, 1. edition October 2008, Wiley-VCH, ISBN 978-3-527-40828-3.
Sheldakova, Julia & Kudryashov, A. & Zavalova, Valentina & Cherezova, T. (2007). Beam quality measurements with Shack-Hartmann wavefront sensor and M2-sensor: Comparison of two methods. Proceedings of SPIE—The International Society for Optical Engineering. 6452.10.1117/12.720045.
Gonzlez, Rafael C. and Woods, Richard C. Digital Image Processing Second Edition, 2002 Prentice Hall, Inc. ISBN: 0-201-18075-8.

What is claimed is:

1. A position measurement system comprising:
a) a measurement source comprising a measurement light source that emits a measurement beam; said measurement beam being a light beam;
b) a target that moves with respect to said measurement source and wherein said target receives the measurement beam;
c) a wavefront sensor that receives said measurement beam;
wherein said wavefront sensor produces wavefront data that includes positional information and distortion information; and
d) a processor that operates a transverse measurement and control algorithm and produces a measurement data output comprising a transverse measurement of said target from said positional information and said distortion information of said wavefront data;
e) a transverse beam splitter, which is a beam splitter; and
f) a beam position sensing device;
wherein said transverse beam splitter splits the measurement beam into a wavefront distortion measurement beam that is directed to the wavefront sensor and a position measurement beam that is directed to said beam position sensing device;
wherein said beam position sensing device receives the measurement beam and produces beam position data; and
wherein the transverse measurement and control algorithm also receives said beam position data to produce the transverse measurement.

2. The position measurement system of claim 1, wherein the wavefront sensor, the transverse beam splitter, and the beam position sensing device are coupled with the measurement source; wherein the target reflects the measurement beam back to the wavefront sensor and the beam position sensing device, wherein the target reflects the measurement beam back to the wavefront sensor and the beam position sensing device.

3. The position measurement system of claim 2, wherein the transverse measurement and control algorithm produces corrected transverse measurements of said target using the distortion information of the wavefront data and the beam position data.

4. The position measurement system of claim 2, wherein the transverse measurement and control algorithm filters the beam position data using the wavefront data to produce the transverse measurement.

5. The position measurement system of claim 2, further comprising a wavefront corrector coupled with the measurement source;
wherein the transverse measurement and control algorithm produces wavefront correction data from the wavefront data; and
wherein said wavefront corrector receives the measurement beam and said wavefront correction data and produces a wavefront corrected beam that is delivered to the position sensing device.

6. The position measurement system of claim 5, wherein said wavefront corrector comprises a deformable minor that reflects a wavefront corrected measurement beam.

7. The position measurement system of claim 5, wherein said wavefront corrector comprises a liquid crystal array that transmits a wavefront corrected measurement beam.

8. The position measurement system of claim 2, further comprising a beam steering assembly coupled with the measurement source capable of keeping the measurement beam on the target as the target moves;
   wherein said beam steering assembly produces beam steering position data representing the orientation of the assembly, which represents the direction of the emitted measurement beam; and
   wherein the transverse measurement and control algorithm also receives said beam steering position data to produce the transverse measurement;
   wherein the transverse measurement and control algorithm also produces a beam steering motor data output that is received by said beam steering assembly causing it to set its orientation such that the emitted measurement beam remains on the target.

9. The position measurement system of claim 8, wherein the transverse measurement and control algorithm produces corrected transverse measurements of said target using the distortion information of the wavefront data and the beam position data.

10. The position measurement system of claim 8, wherein the transverse measurement and control algorithm filters the beam position data using the wavefront data to produce the transverse measurement.

11. The position measurement system of claim 8, further comprising a wavefront corrector that receives the measurement beam produces a wavefront corrected beam that is delivered to the position sensing device.

12. The position measurement system of claim 11, wherein said wavefront corrector comprises a deformable mirror that reflects a wavefront corrected measurement beam.

13. The position measurement system of claim 11, wherein said wavefront corrector wherein the wavefront corrector comprises a liquid crystal array that transmits a wavefront corrected measurement beam.

14. The position measurement system of claim 8, wherein the measurement light source comprises a modulation input that produces said measurement beam as an intensity modulated light beam with a known phase and frequency; wherein said intensity modulated light beam is reflected from the target as a reflected measurement beam to the measurement source; and wherein said measurement source comprises a distance measurement system that comprises:
   a) a distance measurement beam splitter, which is a beam splitter; and
   b) a first radial measurement sensor;
   wherein said distance measurement beam splitter sends splits a portion of the measurement beam toward the wave front sensor and sends the remaining portion as a first radial measurement beam toward said first radial measurement sensor that receives said measurement beam and produces a first phase difference data;
   wherein the processor operates a radial measurement and control algorithm; wherein said first phase difference data is provided to said radial measurement and control algorithm that generates a radial measurement.

15. The position measurement system of claim 2, wherein the measurement light source comprises a modulation input that produces said measurement beam as an intensity modulated light beam with a known phase and frequency; wherein said intensity modulated light beam is reflected from the target as a reflected measurement beam to the measurement source; and wherein said measurement source comprises a distance measurement system that comprises:
   a) a distance measurement beam splitter, which is a beam splitter; and
   b) a first radial measurement sensor;
   wherein said distance measurement beam splitter sends splits a portion of the measurement beam toward the wavefront sensor and sends the remaining portion as a first radial measurement beam toward said first radial measurement sensor that receives said measurement beam and produces a first phase difference data; and
   wherein the processor operates a radial measurement and control algorithm; wherein said first phase difference data is provided to said radial measurement and control algorithm that generates a radial measurement.

16. The position measurement system of claim 1, wherein the wavefront sensor, the transverse beam splitter, and the beam position sensing device are coupled with the target.

17. The position measurement system of claim 16, wherein the transverse measurement and control algorithm produces corrected transverse measurements of said target using the distortion information of the wavefront data and the beam position data.

18. The position measurement system of claim 16, wherein the transverse measurement and control algorithm filters the beam position data using the wavefront data to produce the transverse measurement.

19. The position measurement system of claim 16, further comprising a wavefront corrector coupled with the target;
   wherein the transverse measurement and control algorithm produces wavefront correction data from the wavefront data; and
   wherein said wavefront corrector receives the measurement beam and said wavefront correction data and produces a wavefront corrected beam that is delivered to the position sensing device.

20. The position measurement system of claim 19, wherein said wavefront corrector comprises a deformable mirror that reflects a wavefront corrected measurement beam.

21. The position measurement system of claim 19, wherein said wavefront corrector
   wherein the wavefront corrector comprises a liquid crystal array that transmits a wavefront corrected measurement beam.

22. The position measurement system of claim 16, further comprising a beam steering assembly coupled with the target capable of keeping the measurement beam on the wavefront sensor as the target moves;
   wherein said beam steering assembly produces beam steering position data representing the orientation of the assembly, which represents the direction of the received measurement beam;
   wherein the transverse measurement and control algorithm also receives said beam steering position data to produce the transverse measurement; and
   wherein the transverse measurement and control algorithm also produces a beam steering motor data output that is received by said beam steering assembly causing it to set its orientation such that the emitted measurement beam remains on the wavefront sensor.

23. The position measurement system of claim 5, wherein the measurement light source comprises a modulation input that produces said measurement beam as an intensity modulated light beam with a known phase and frequency; wherein said intensity modulated light beam is reflected from the target as a reflected measurement beam to the measurement source; and wherein said measurement source comprises a distance measurement system that comprises:

a) a distance measurement beam splitter, which is a beam splitter; and
b) a first radial measurement sensor;
wherein said distance measurement beam splitter sends splits a portion of the measurement beam toward the wavefront sensor and sends the remaining portion as a first radial measurement beam toward said first radial measurement sensor that receives said measurement beam and produces a first phase difference data;
wherein the processor operates a radial measurement and control algorithm; wherein said first phase difference data is provided to said radial measurement and control algorithm that generates a radial measurement.

\* \* \* \* \*